(12) United States Patent
Sakamoto et al.

(10) Patent No.: US 10,233,942 B2
(45) Date of Patent: Mar. 19, 2019

(54) FLUID DEVICE

(71) Applicant: DAIKIN INDUSTRIES, LTD., Osaka-shi, Osaka (JP)

(72) Inventors: Tomomi Sakamoto, Shiga (JP); Hiroyuki Ikegami, Shiga (JP); Atsushi Suhara, Shiga (JP); Yuzou Sawada, Shiga (JP)

(73) Assignee: Daikin Industries, Ltd., Osaka-shi, Osaka (JP)

( * ) Notice: Subject to any disclaimer, the term of this patent is extended or adjusted under 35 U.S.C. 154(b) by 291 days.

(21) Appl. No.: 14/762,728

(22) PCT Filed: Nov. 20, 2013

(86) PCT No.: PCT/JP2013/006824
§ 371 (c)(1),
(2) Date: Jul. 22, 2015

(87) PCT Pub. No.: WO2014/115208
PCT Pub. Date: Jul. 31, 2014

(65) Prior Publication Data
US 2015/0369258 A1    Dec. 24, 2015

(30) Foreign Application Priority Data

Jan. 25, 2013  (JP) .................................. 2013-012537
Jan. 25, 2013  (JP) .................................. 2013-012578

(51) Int. Cl.
*F04D 29/00* (2006.01)
*F04D 29/58* (2006.01)
(Continued)

(52) U.S. Cl.
CPC ......... *F04D 29/5813* (2013.01); *F04D 13/06* (2013.01); *F04D 13/0686* (2013.01);
(Continued)

(58) Field of Classification Search
CPC ... F04D 29/5806; F04D 29/5813; H02K 9/19; H02K 9/18
See application file for complete search history.

(56) References Cited

U.S. PATENT DOCUMENTS 2,531,335 A * 11/1950 Harvey ................... F04C 14/06
                                                           123/41.44
2,810,348 A * 10/1957 White ..................... F04C 11/008
                                                           310/54
(Continued)

FOREIGN PATENT DOCUMENTS

DE         4311518 A1    10/1994
DE     102007036240 A1    2/2009
(Continued)

OTHER PUBLICATIONS

International Search Report, issued in PCT/JP2013/006824, dated Mar. 4, 2014.
(Continued)

*Primary Examiner* — Devon Kramer
*Assistant Examiner* — Christopher Bobish
(74) *Attorney, Agent, or Firm* — Birch, Stewart, Kolasch & Birch, LLP

(57) ABSTRACT

A fluid device having a fluid machine and a rotary electric machine includes a fluid machine and a rotary electric machine connected to a rotating shaft of the fluid machine. A cooler is arranged for carrying out liquid-cooling using a fluid of a cooling pipe connecting an upstream portion and a downstream portion of the fluid machine to bypass the fluid machine. The fluid machine and the rotary electric machine are detachably coupled to each other. Hence, the rotary electric machine can enhance the cooling perfor-
(Continued)

mance for the rotary electric machine and reduce its size, achieving improvements in maintainability and serviceability.

7 Claims, 17 Drawing Sheets

(51) Int. Cl.
  H02K 5/20   (2006.01)
  H02K 9/19   (2006.01)
  H02K 7/18   (2006.01)
  F04D 13/06  (2006.01)
  F04D 29/42  (2006.01)

(52) U.S. Cl.
  CPC ..... *F04D 29/4293* (2013.01); *F04D 29/5806* (2013.01); *H02K 5/20* (2013.01); *H02K 7/1823* (2013.01); *H02K 9/19* (2013.01)

(56) References Cited

U.S. PATENT DOCUMENTS

| | | | | |
|---|---|---|---|---|
| 3,223,043 A * | 12/1965 | Shapiro | ............... | H02K 5/1282 310/268 |
| 3,572,976 A * | 3/1971 | Sato | ................... | F04D 13/0613 310/63 |
| 3,891,355 A * | 6/1975 | Hecht | ................... | F04D 23/008 310/63 |
| 4,834,624 A | 5/1989 | Jensen et al. | | |
| 6,685,447 B2 * | 2/2004 | Mabe | ...................... | F04B 35/04 29/428 |
| 7,218,515 B2 * | 5/2007 | Vinson | ................. | F04D 25/166 165/121 |
| 9,093,871 B2 * | 7/2015 | Artinian | ............... | F04D 29/048 |
| 2012/0090087 A1 | 4/2012 | Korupp et al. | | |
| 2014/0030124 A1 | 1/2014 | Høj et al. | | |

FOREIGN PATENT DOCUMENTS

| | | | | |
|---|---|---|---|---|
| DE | 102010038137 A1 | 4/2012 | | |
| EP | 2500576 A1 | 9/2012 | | |
| EP | 2639945 A2 * | 9/2013 | ............. | H02K 5/225 |
| GB | 2199081 A | 6/1988 | | |
| JP | 2005-20881 A | 1/2005 | | |
| JP | 2009-278809 A | 11/2009 | | |
| JP | 2011-89476 A | 5/2011 | | |
| JP | WO 2012046794 A1 * | 4/2012 | ............... | H02K 9/14 |

OTHER PUBLICATIONS

Written Opinion of the International Searching Authority, issued in PCT/JP2013/006824, dated Mar. 4, 2014.

* cited by examiner

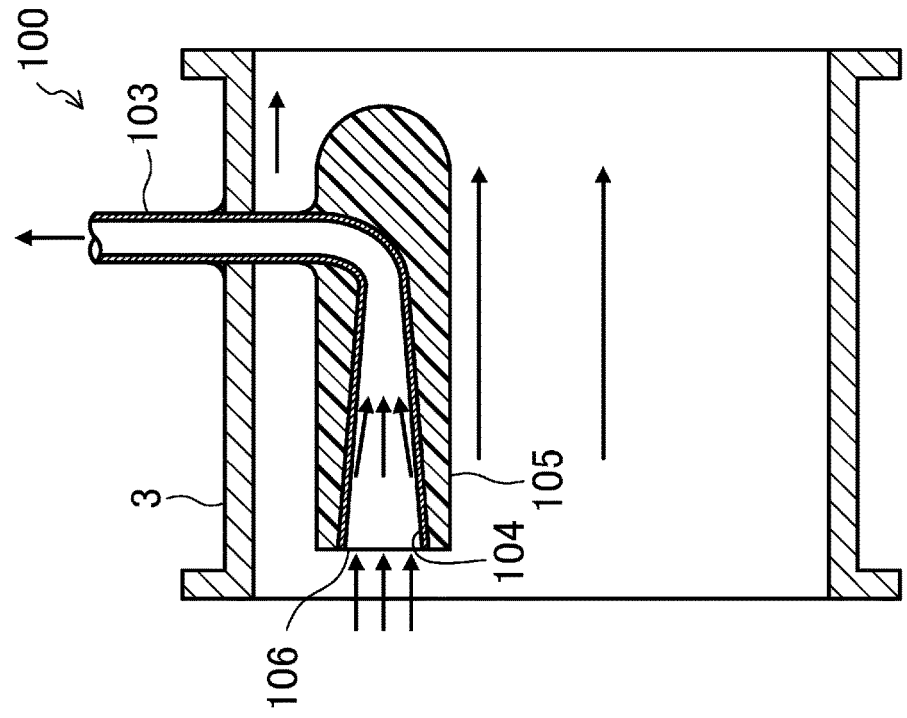
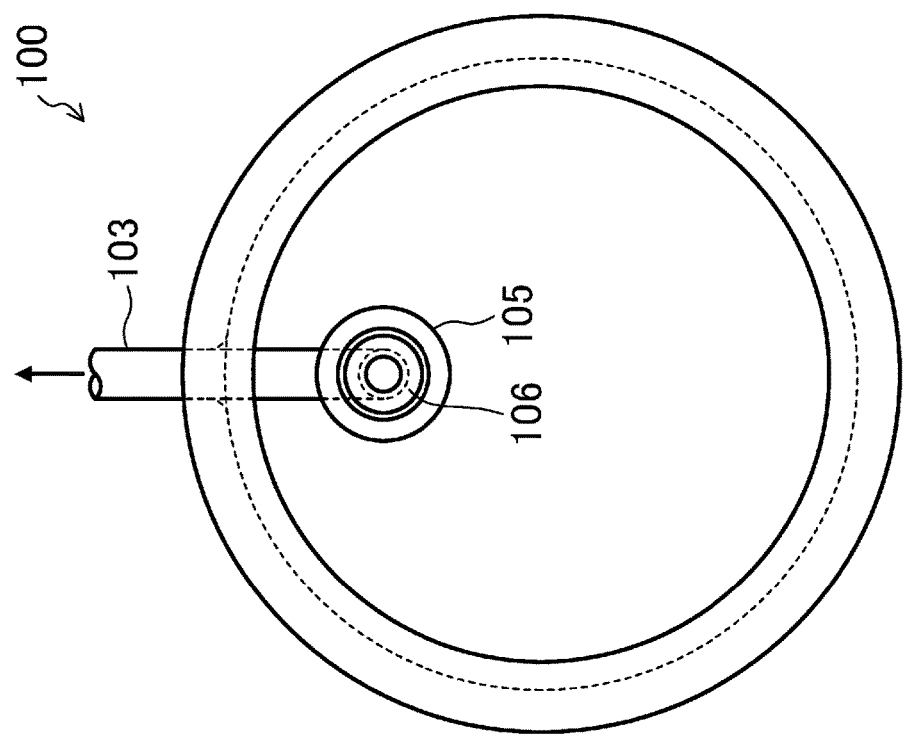

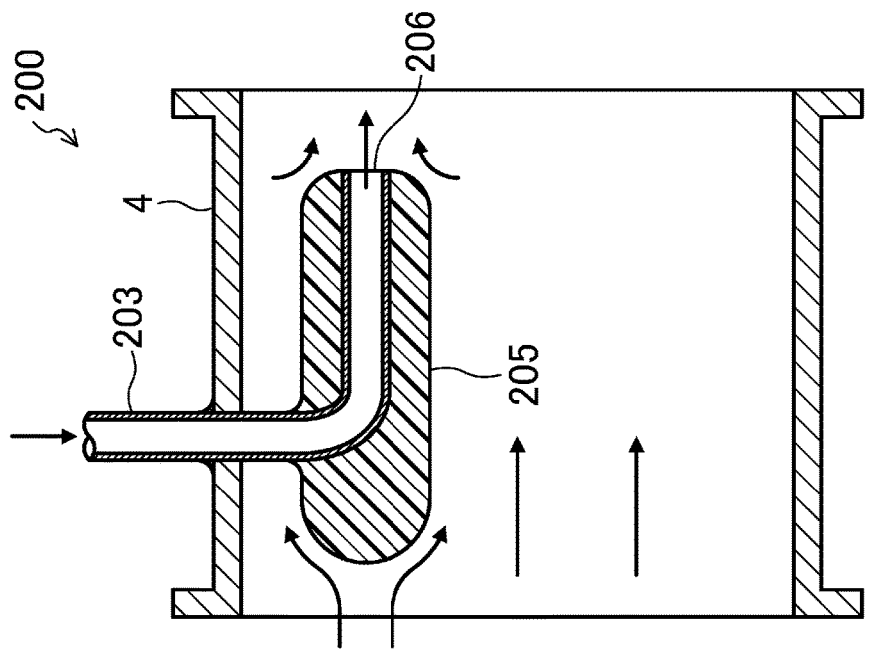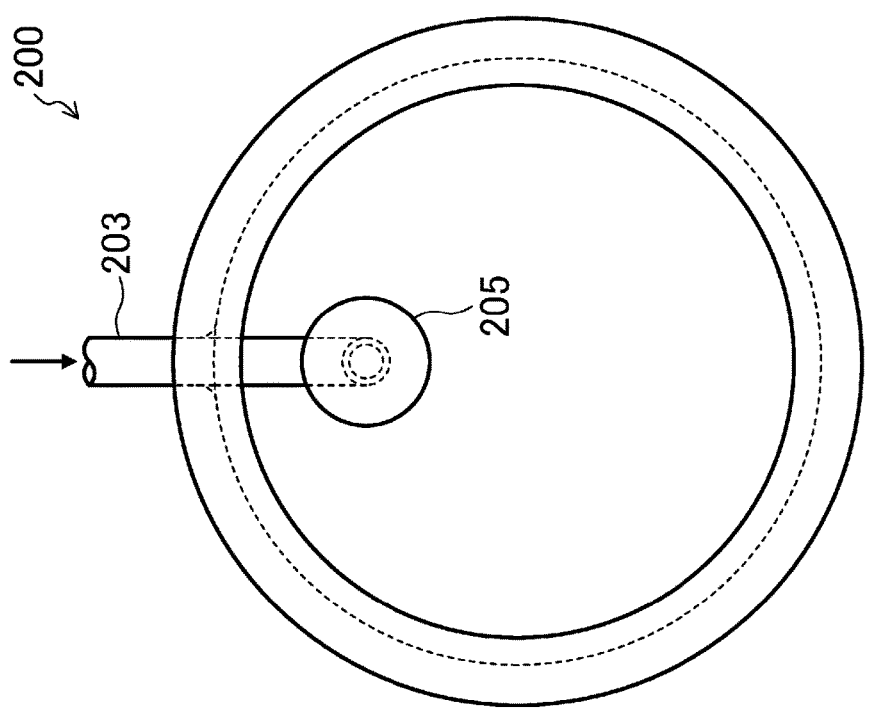

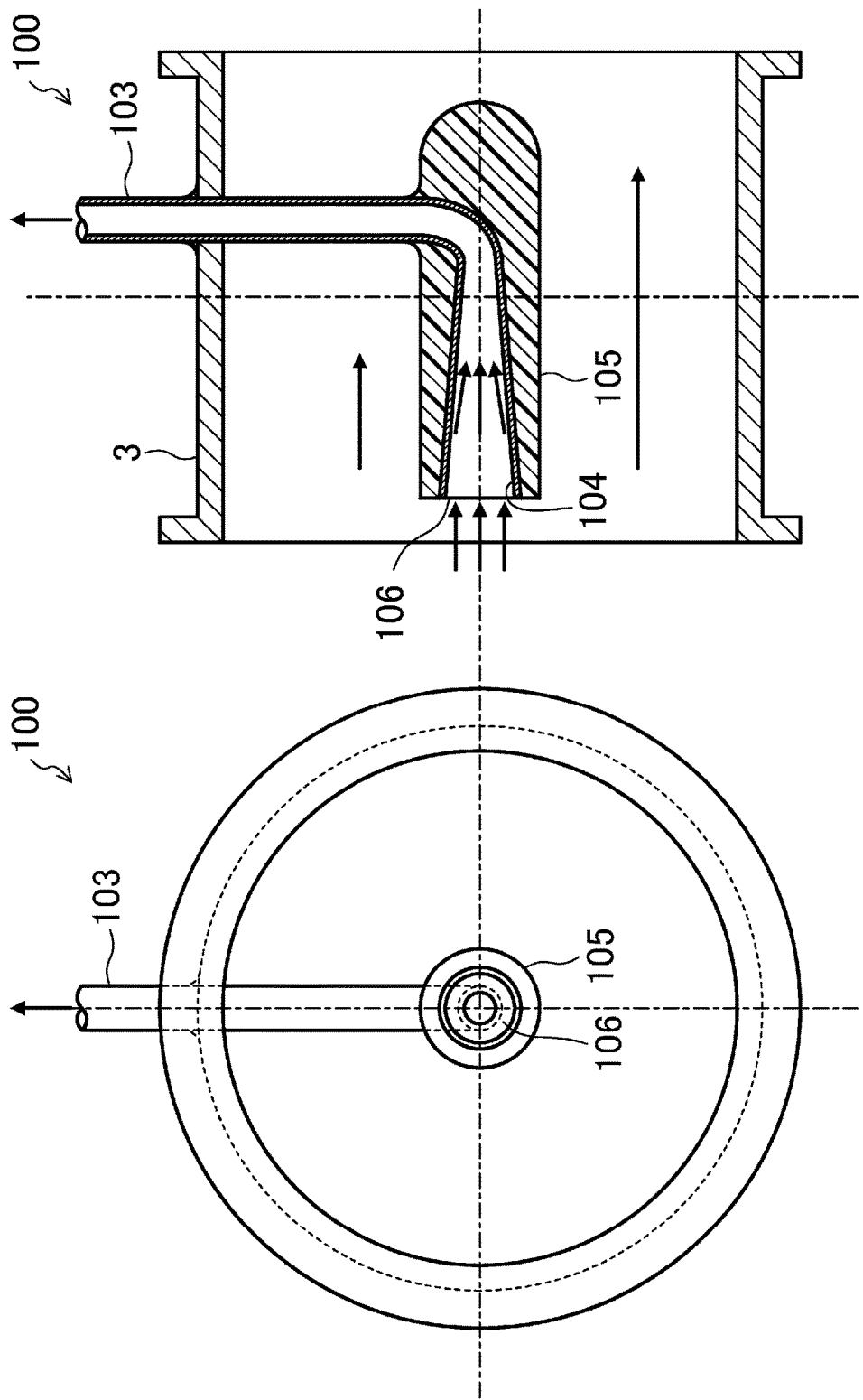

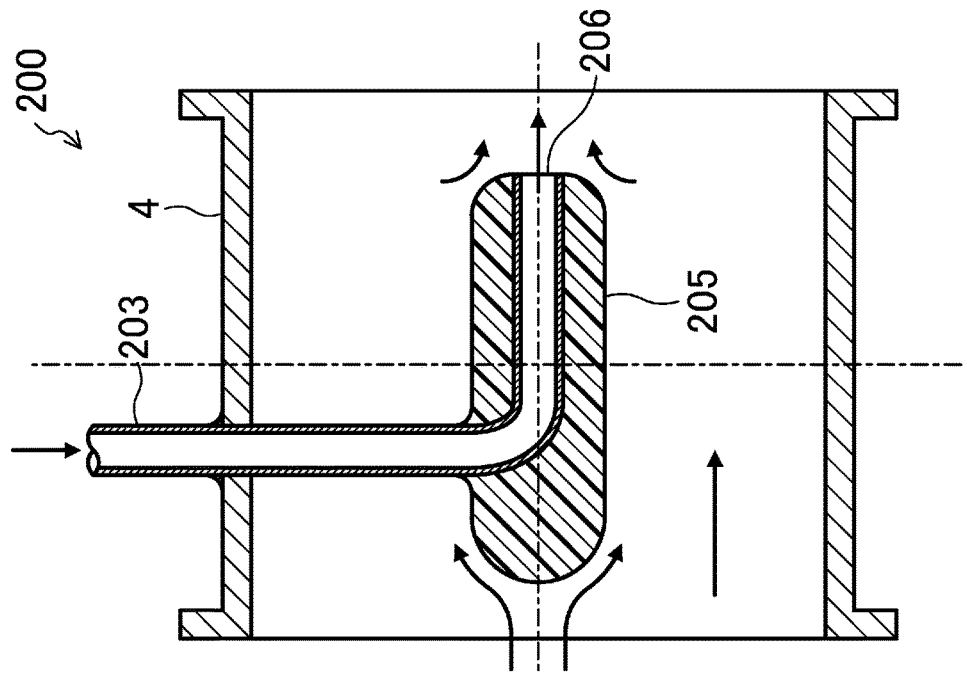
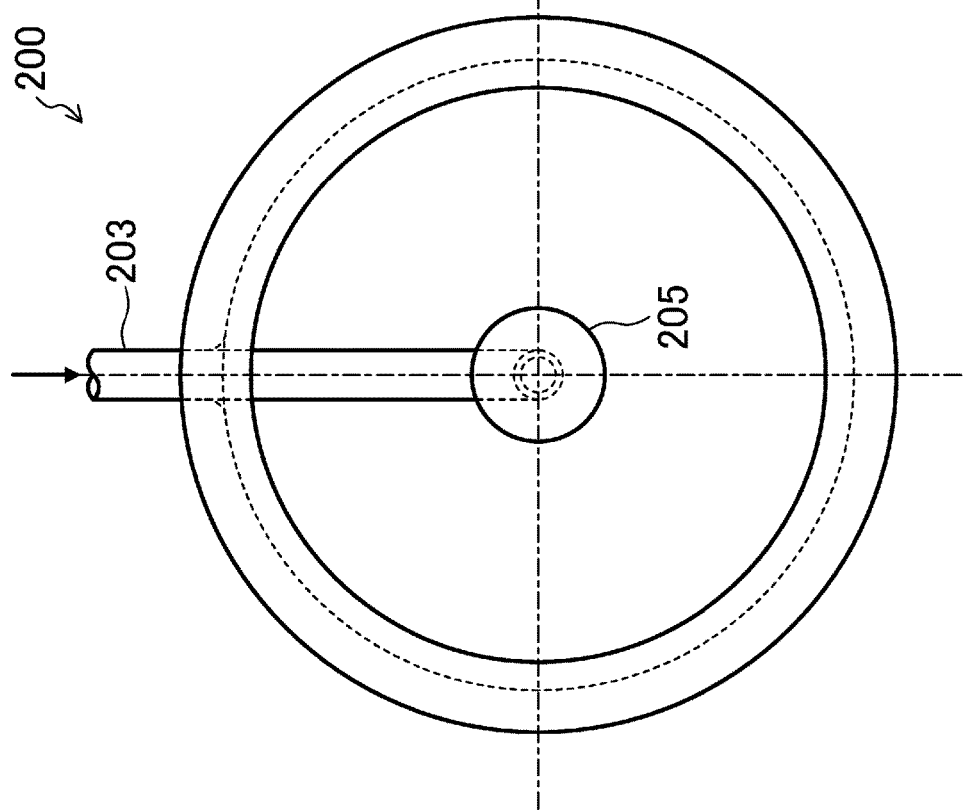

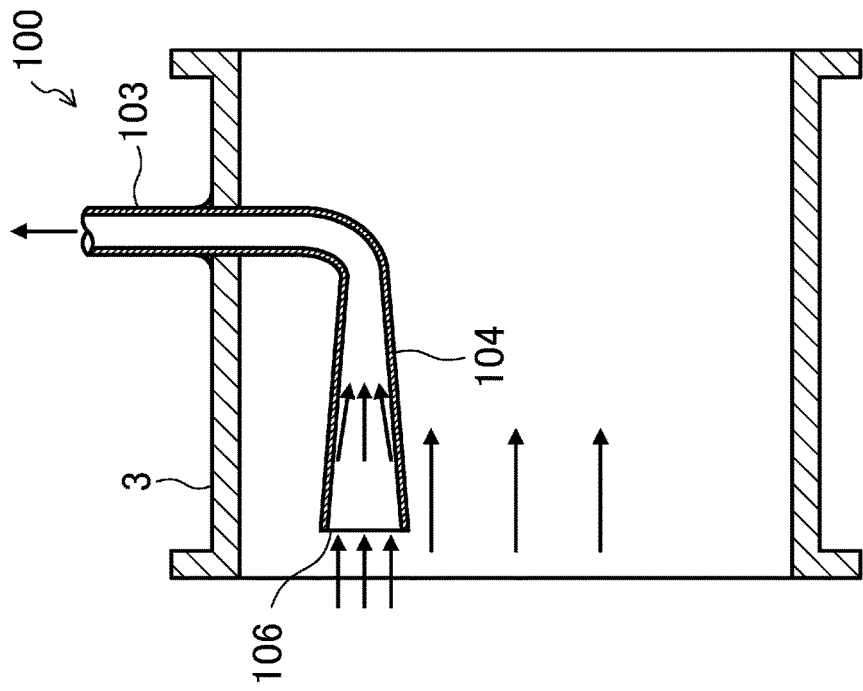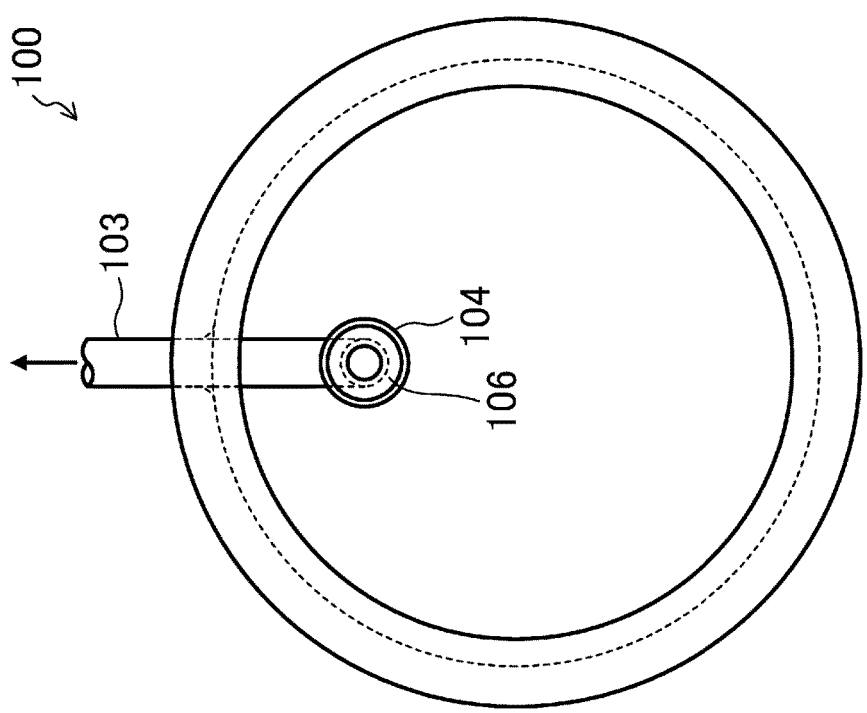

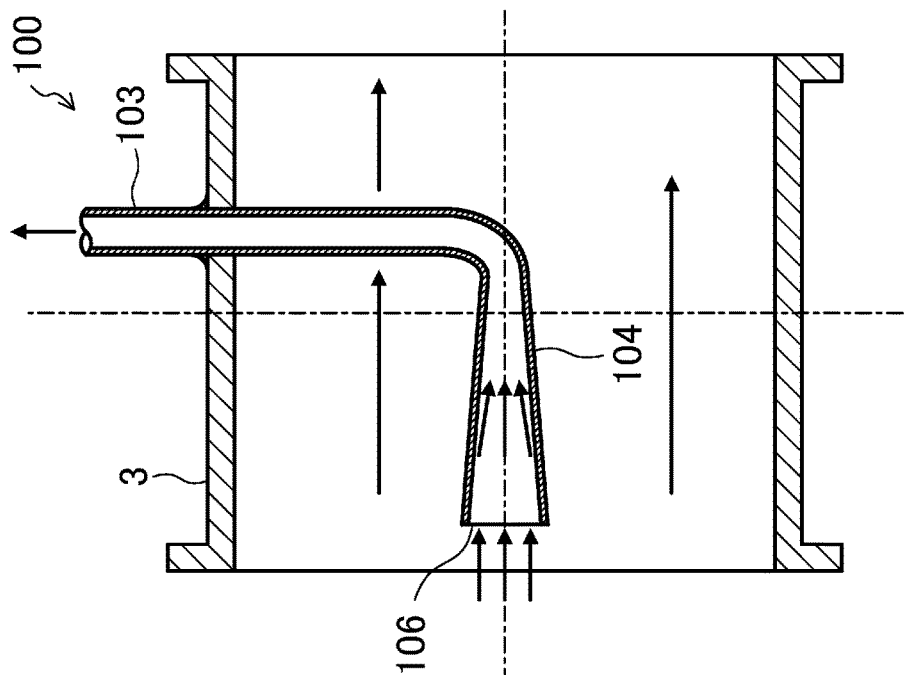
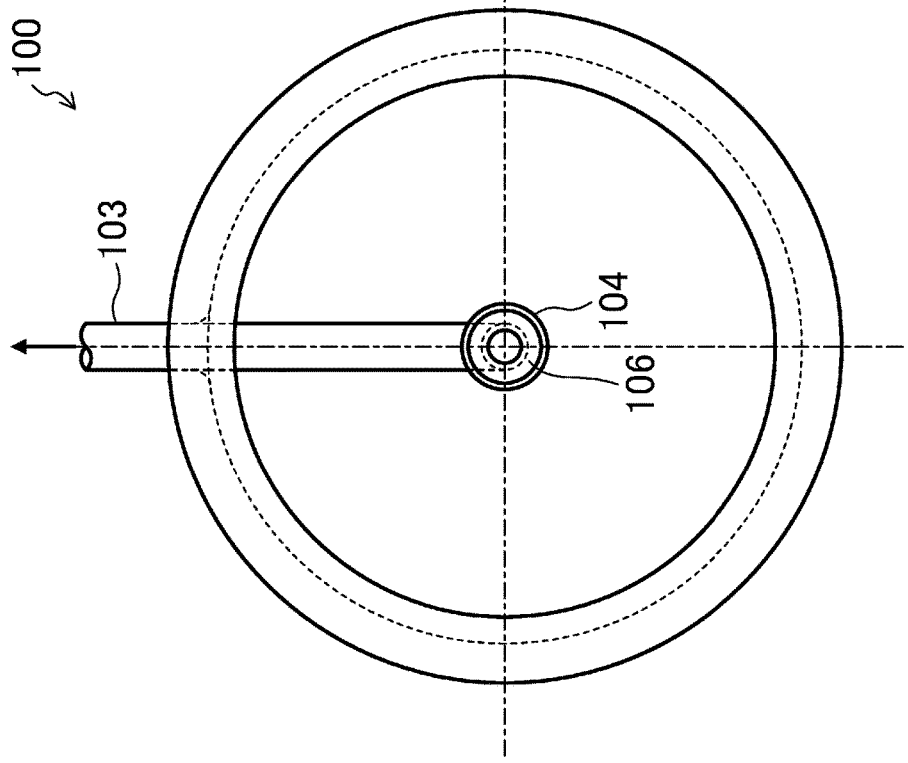

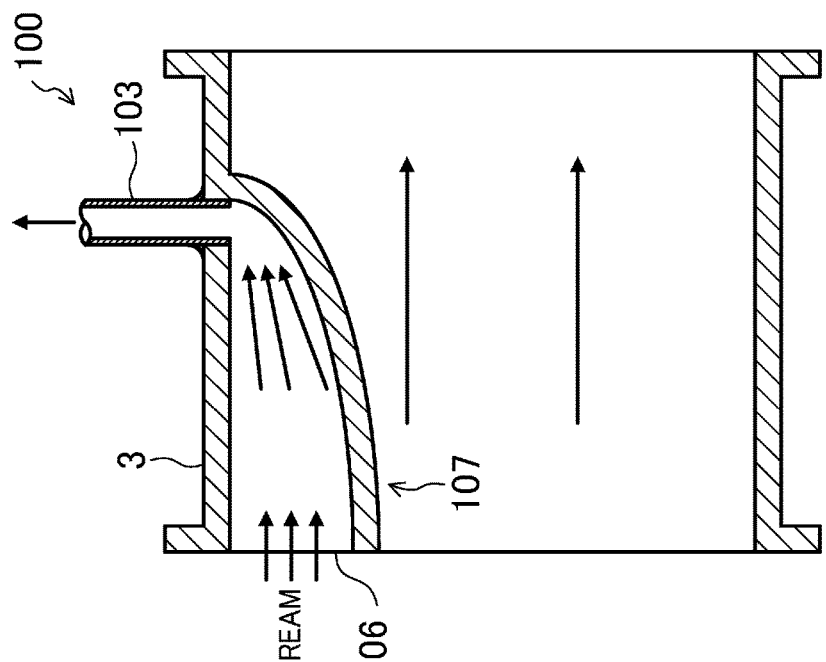
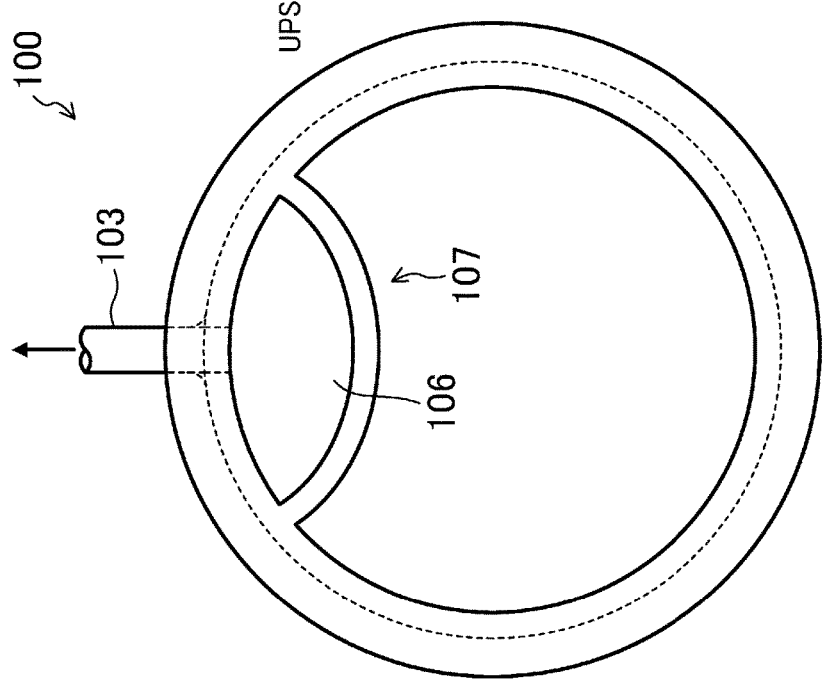

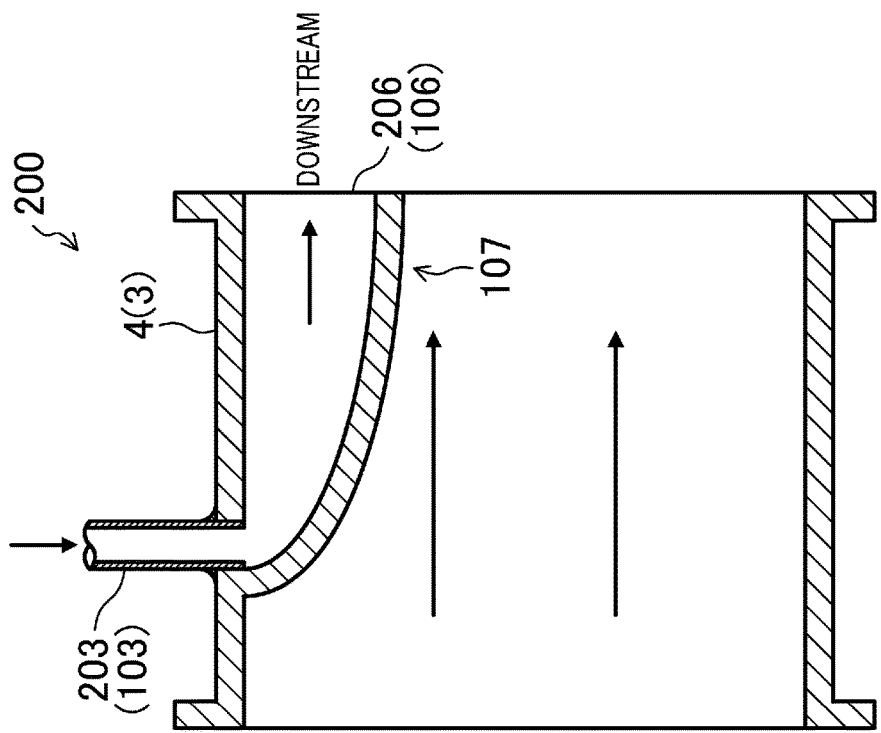
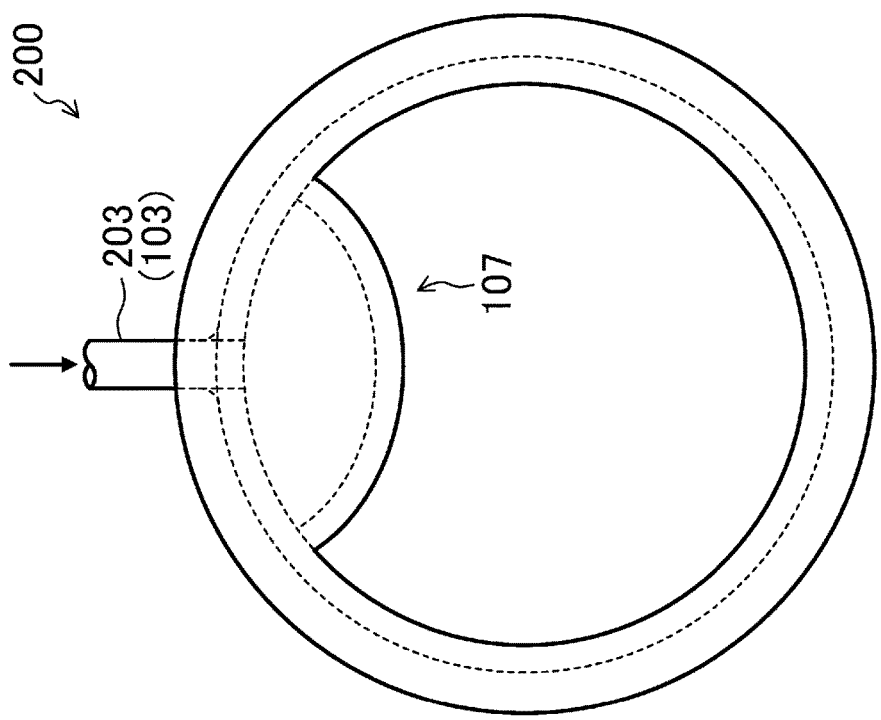

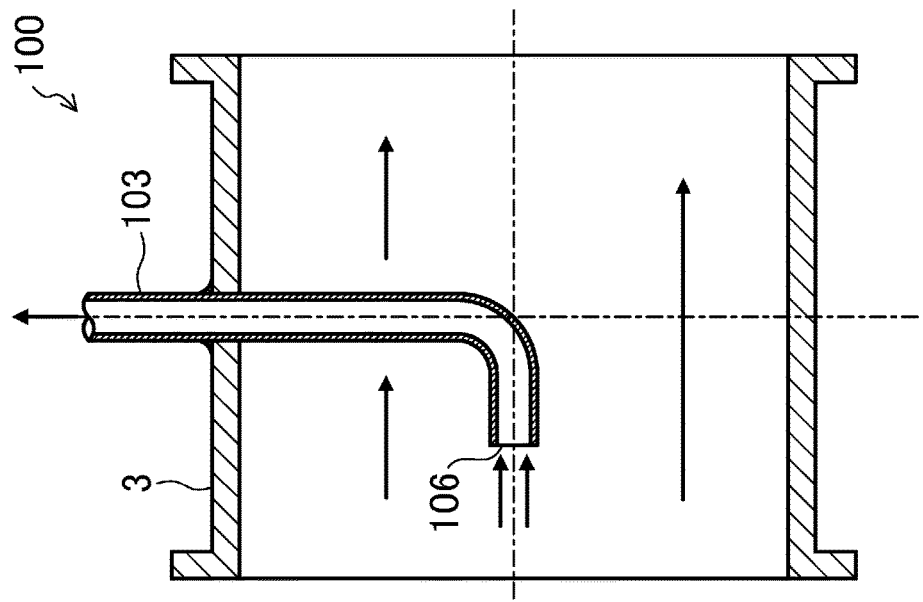
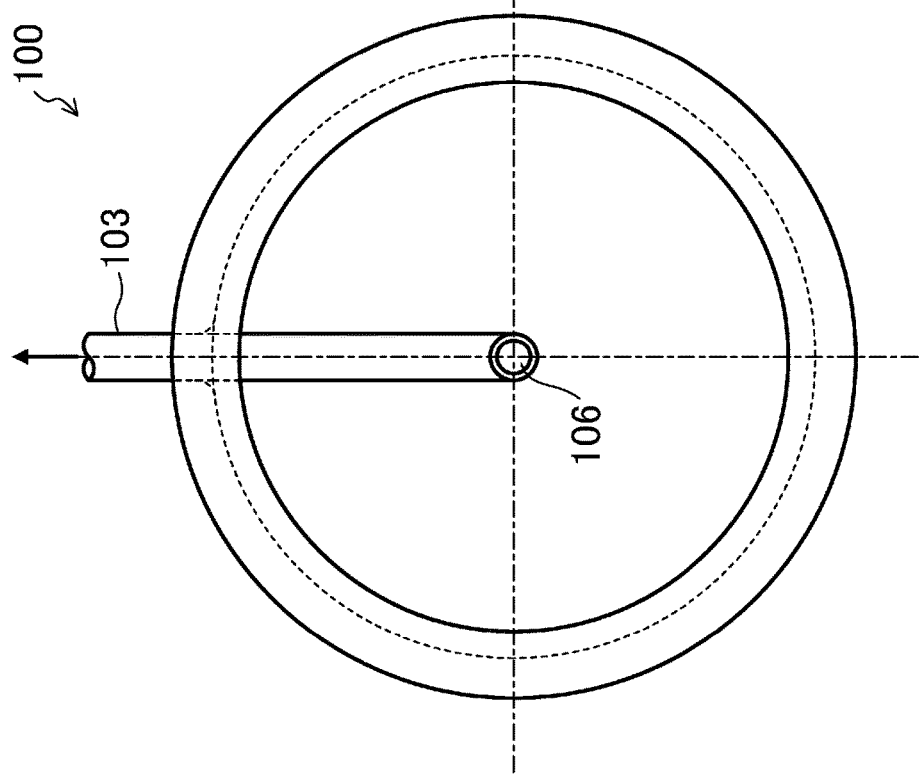

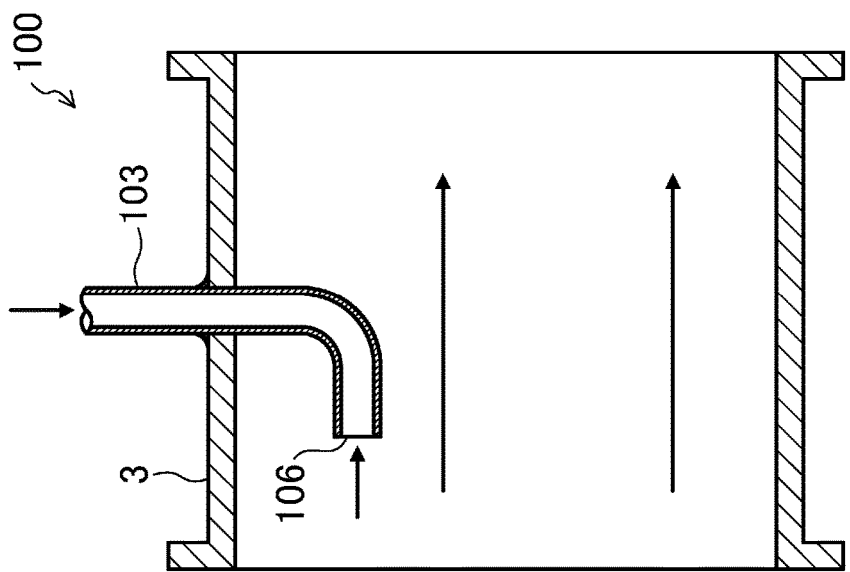
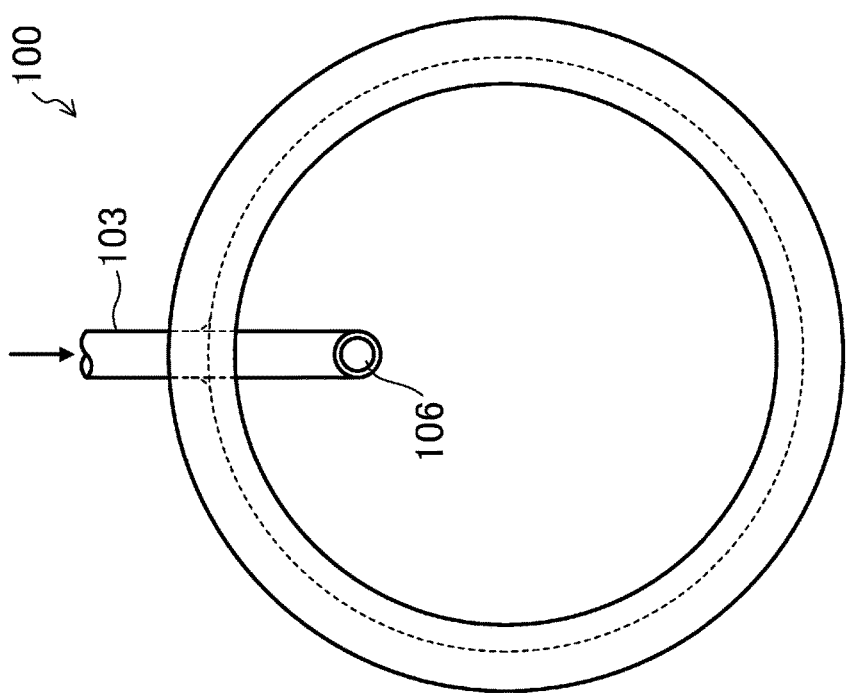

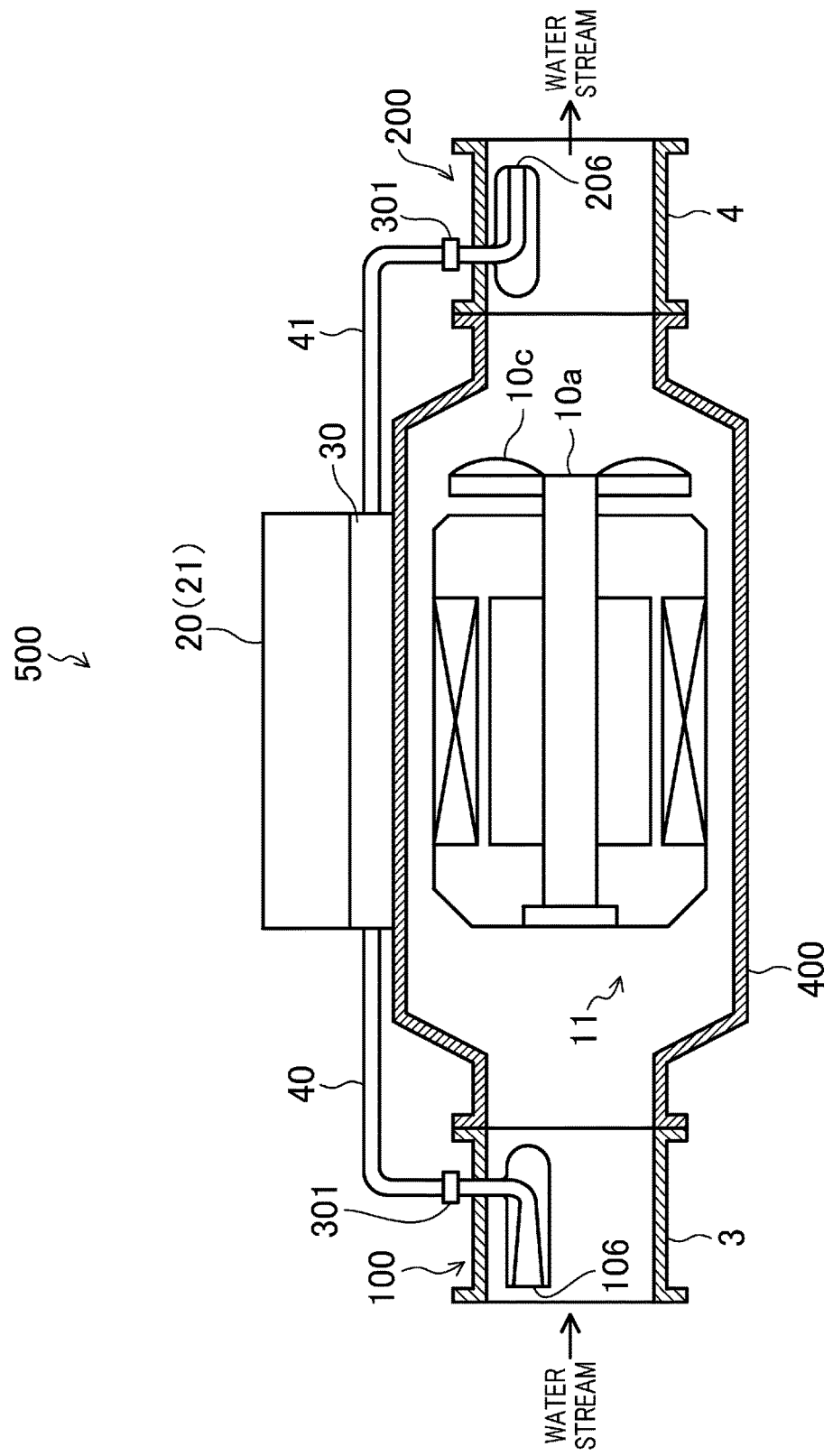

FLUID DEVICE

TECHNICAL FIELD

The present invention relates to an improvement of a fluid device including a hydropower machine such as a water wheel or a pump, and a rotary electric machine, such as a generator or an electric motor. The present invention is especially directed to an enhancement in the serviceability of the fluid device.

BACKGROUND ART

A typical hydroelectric generating device known in the art includes a water wheel and a generator whose rotating shaft is connected to the water wheel, with the water wheel and the generator housed in a single casing. The hydroelectric generating device is configured to: provide a water stream, supplied to an end of the casing, to the water wheel; let the water stream flow out of the other end of the casing to drive the water wheel to rotate; and cause the rotation of the water wheel to drive the rotating shaft of the generator to rotate and generate electricity as well as cool the generator housed in the casing using the water stream flowing into the casing. In addition, among hydroelectric generating devices including a water wheel and a generator, Patent Document 1 discloses a hydroelectric generating device whose generator is water cooled.

Furthermore, a typical pump system in the known art, including a pump and an electric motor, is structured so that: a water pump is connected to the rotating shaft of the electric motor, with the water pump and the electric motor vertically arranged; and a power conversion controller (an inverter, for example) for controlling the electric motor is arranged and connected to a side of the electric motor. The pump system is configured to have the water pump arranged in a connecting portion between inlet and outlet pipes, cause the electric motor, powered by electricity, to drive the water pump to rotate, and supply a water stream from the outlet pipe.

CITATION LIST

Patent Document

PATENT DOCUMENT 1: Japanese Patent Publication No. 2011-89476

SUMMARY OF THE INVENTION

Technical Problem

In the above hydroelectric generating device, the generator is configured to be water-cooled so that the water stream flowing into the casing cools the generator. Hence, it is possible to enhance the performance of cooling the generator and reduce the size of the generator. However, the generator is built in the casing together with the water wheel. Therefore, there is a drawback that the generator in the casing is low in maintainability and serviceability.

In the above pump system, moreover, the electric motor and the power conversion controller, such as an inverter, arranged to the side of the electric motor are air-cooled. Therefore, there is a drawback that the air-cooled electric motor and power conversion controller are low in cooling performance and large in size.

In view of the foregoing background, it is therefore an object of the present invention to provide a fluid device including a hydropower machine such as a water wheel or a pump, and a rotary electric machine, such as a generator or an electric motor. Here, the rotary electric machine or a power conversion controller of the fluid device is configured to be water-cooled to enhance the cooling performance for the device. Such a water-cooled rotary electric machine or power conversion controller is designed to be detachably coupled to each other, achieving improvements in size to be small and in the maintainability and serviceability of the rotary electric machine.

Solution to the Problem

In order to achieve the above object, a fluid device of the present invention includes a hydropower machine (15), and a rotary electric machine (11) coupled to the hydropower machine (15). The fluid device comprises: a cooling pipe (40, 41) configured to connect an upstream portion and a downstream portion of the hydropower machine (15) to bypass the hydropower machine (15), and convey a fluid; and a cooler (30, 31) arranged at some midpoint in the cooling pipe (40, 41), and configured to carry out liquid-cooling using the fluid flowing through the cooling pipe (40, 41). The hydropower machine (15) and the rotary electric machine (11) are detachably coupled to each other.

In the fluid device of the present invention, the fluid flows into the cooler via the cooling pipe, and this cooler cools, for example, the rotary electric machine and the power conversion controller. Hence, these rotary electric machine and power conversion controller are configured to be liquid-cooled to enhance the cooling performance for the devices and reduce their sizes.

In addition, the hydropower machine and the rotary electric machine are detachably coupled to each other. Such a feature enables the hydropower machine and the rotary electric machine to be easily maintained and serviced for a short period of time.

The fluid device of the present invention may comprise a power conversion controller (20, 21). The cooler (30, 31) is a bi-directional cooler (30, 31) sandwiched between the rotary electric machine (11) and the power conversion controller (20, 21), and configured to cool both the rotary electric machine (11) and the power conversion controller (20, 21) using the fluid flowing through the cooling pipe (40, 41).

In the present invention, the rotary electric machine and the power conversion controller are arranged to the respective sides of the bi-directional cooler. This one bi-directional cooler simultaneously cools the rotary electric machine and the power conversion controller. Here, the cooling system of the rotary electric machine and the power conversion controller is a single system. Such a feature allows the entire fluid device to be smaller in size and lighter in weight, designing the rotary electric machine and the power conversion controller to be liquid-cooled, thus contributing to reduction in price, conservation of installation space, and simplification of installment and maintenance.

The power conversion controller (20, 21) in the fluid device of the present invention may include: a first power conversion controller (20) configured to convert or control power obtained by the rotary electric machine (11) or from a power source; and a second power conversion controller (21) configured to further convert or control the power converted or controlled by the first power conversion controller (20). The bi-directional cooler (30, 31) may include: a first cooler (30) sandwiched between the rotary electric machine (11) and the first power conversion controller (20);

and a second cooler (31) sandwiched between the rotary electric machine (11) and the second power conversion controller (21).

In the present invention, the rotary electric machine and the first and second power conversion controllers are simultaneously cooled, since the rotary electric machine and the first power conversion controller are arranged to the respective sides of the first cooler, and the rotary electric machine and the second power conversion controller are arranged to the respective sides of the second cooler. Such arrangements allow the entire fluid device, including the rotary electric machine and the first and second power conversion controller, to be smaller in size, lighter in weight, lower in price, less in installation space, and simpler in installment and maintenance, designing the rotary electric machine and the first and second coolers to be liquid-cooled.

The fluid device of the present invention includes a rotary electric machine cooler (32) configured to cool the rotary electric machine (11) using the fluid supplied through the cooling pipe (40, 41). The rotary electric machine cooler (32) is positioned at an end portion of the rotary electric machine (11), the end portion being other than end portions, of the rotary electric machine (11), at which the first and second coolers (30, 31) are positioned.

In this present invention, the rotary electric machine is cooled by the rotary electric machine cooler in addition to by the first and second coolers of the bi-directional cooler. Such a feature contributes to a further improvement in the cooling performance for the rotary electric machine.

The fluid device of the present invention has the following features: the rotary electric machine (11) is arranged above the hydropower machine (15); the first and second power conversion controllers (20, 21) and the first and second coolers (30, 31) are arranged to sides of the rotary electric machine (11), the sides being perpendicular to a direction of a fluid flowing through the hydropower machine (15); and the rotary electric machine cooler (32) is arranged above the rotary electric machine (11).

In the present invention, the positions are identified as to where to arrange the first and second power conversion controllers and the first and second coolers, and these components are arranged to sides, of the rotary electric machine, perpendicular to the direction of the fluid flowing through the hydropower machine. Hence, when the rotary electric machine and power conversion controller are on maintenance and service, it is possible to maintain and service the rotary electric machine and power conversion controller easily without the obstruction of the fluid inlet and outlet pipes connected to the hydropower machine. The arrangement further enables the rotary electric machine cooler to separately and effectively cool the coil end and the bearing of the stator in the rotary electric machine that would be a relatively high temperature.

The fluid device of the present invention has the following features: the rotary electric machine (11) is arranged above the hydropower machine (15); the first and second power conversion controllers (20, 21) and the first and second coolers (30, 31) are arranged to sides of the rotary electric machine (11), the sides being in parallel with the direction of the fluid flowing through the hydropower machine (15); and the rotary electric machine cooler (32) is arranged above the rotary electric machine (11).

In the present invention, the positions are identified as to where to arrange the first and second power conversion controllers and the first and second coolers, and these components are arranged to sides, of the rotary electric machine, in parallel with a direction of a fluid flowing through the hydropower machine. Such arrangement enables the first and second power conversion controllers and the first and second coolers to be arranged along the direction in which a fluid pipe connected to the hydropower machine extends, contributing to downsizing the entire fluid device.

In the fluid device of the present invention, the cooling pipe (40, 41) branches in parallel off to the first and second coolers (30, 31) of the bi-directional cooler (30, 31), and to the rotary electric machine cooler (32).

In the present invention, the bi-directional cooler—the first and second coolers—and the rotary electric machine cooler are connected to the cooling pipe in parallel, reducing the resistance of the fluid flowing through the cooling pipe. Hence, even if the fluid device is installed in a fluid passageway in which the difference in height is small or the pump acting as the fluid machine is small in capacity, the connection in parallel allows a sufficient amount of fluid to be supplied to these three coolers. Such a connection successfully enables cooling the rotary electric machine and the first and second power conversion controller.

Advantages of the Invention

The fluid device of the present invention allows, for example, the rotary electric machine and the power conversion controller to be liquid-cooled, enhancing the cooling performance for the devices and reducing their sizes. The fluid device of the present invention also allows the hydropower machine and the rotary electric machine to be detachably coupled to each other, enabling the hydropower machine and the rotary electric machine to be easily maintained and serviced for a short period of time.

Moreover, the present invention allows for designing the cooling system of the rotary electric machine and the power conversion controller to be a single system. Such a feature enables the entire fluid device to be smaller in size and lighter in weight, allowing for reduction in price, conservation of installation space, and simplification of installment and maintenance.

Furthermore, even if the power conversion controller includes multiple power conversion controllers, the present invention makes it possible to simplify the cooling system of the rotary electric machine and the multiple power conversion controllers. Such a feature allows the entire fluid device, including the rotary electric machine and the power conversion controllers, to be smaller in size, lighter in weight, lower in price, less in installation space, and simpler in installment and maintenance.

In addition, the present invention allows three coolers to cool the rotary electric machine, contributing to further improvement in the cooling performance for the rotary electric machine.

Moreover, in the present invention, when the rotary electric machine and power conversion controller are on maintenance and service, it is possible to maintain and service the rotary electric machine and power conversion controller easily without the obstruction of the fluid inlet and outlet pipes connected to the hydropower machine, and to effectively cool a portion of the rotary electric machine which reaches a high temperature.

Furthermore, the present invention allows the power conversion controller and the cooler to be arranged along the direction of the fluid flowing through the hydropower machine, contributing to downsizing the entire fluid device.

In addition, even if the fluid device installed in a fluid passageway in which the difference in height is small or a pump included in the fluid device is small in capacity, the present invention successfully enables cooling the rotary electric machine and the multiple power conversion controllers.

BRIEF DESCRIPTION OF THE DRAWINGS

FIGS. 4A and 4B are respectively a front elevational view and a side elevational and cross-sectional view of a coolant-drawing device according to the first embodiment.

FIGS. 5A and 5B are respectively a front elevational view and a side elevational and cross-sectional view of a coolant-returning device according to the first embodiment.

FIGS. 6A and 6B are respectively a front elevational view and a side elevational and cross-sectional view of the coolant-drawing device whose water inlet is aligned with the center of a flanged pipe.

FIGS. 7A and 7B are respectively a front elevational view and a side elevational and cross-sectional view of the coolant-returning device whose water outlet is aligned with the center of a flanged pipe.

FIGS. 8A and 8B are respectively a front elevational view and a side elevational and cross-sectional view of the coolant-drawing device according to a first variation.

FIGS. 9A and 9B are respectively a front elevational view and a side elevational and cross-sectional view of the coolant-drawing device whose water inlet is aligned with the center of the flanged pipe in the first variation.

FIGS. 10A and 10B are respectively a front elevational view and a side elevational and cross-sectional view of the coolant-drawing device according to a second variation.

FIGS. 11A and 11B are respectively a front elevational view and a side elevational and cross-sectional view of the coolant-drawing device according to the second variation when the coolant-drawing is used as a coolant-returning device.

FIGS. 12A and 12B are respectively a front elevational view and a side elevational and cross-sectional view of the coolant-drawing device according to a third variation.

FIGS. 13A and 13B are respectively a front elevational view and a side elevational and cross-sectional view of the coolant-drawing device having a water inlet offset from the center of the flanged pipe in the third variation.

FIG. 16 is a longitudinal cross-sectional view of a hydroelectric generating system according to a second embodiment.

DESCRIPTION OF EMBODIMENTS

Embodiments of the present invention will now be described with reference to the drawings. Note that the embodiments below are essentially preferable examples, and are not intended to limit the present invention, the applications to the present invention, or the scope of a usage of the present invention.

<<First Embodiment of the Invention>>

Figure 1:
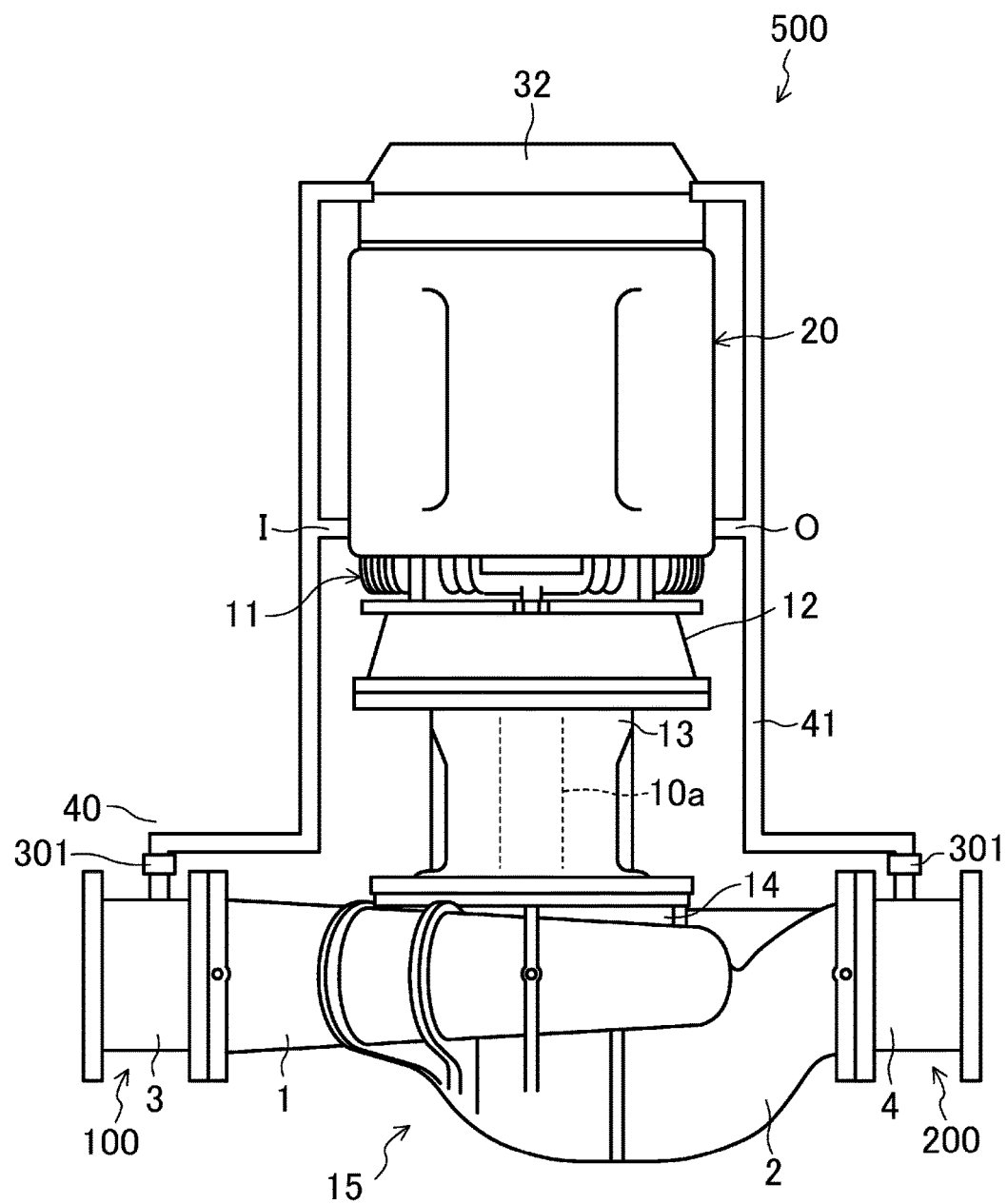
FIG. 1 is a general front elevational view of a fluid device according to a first embodiment.
Figure 2:
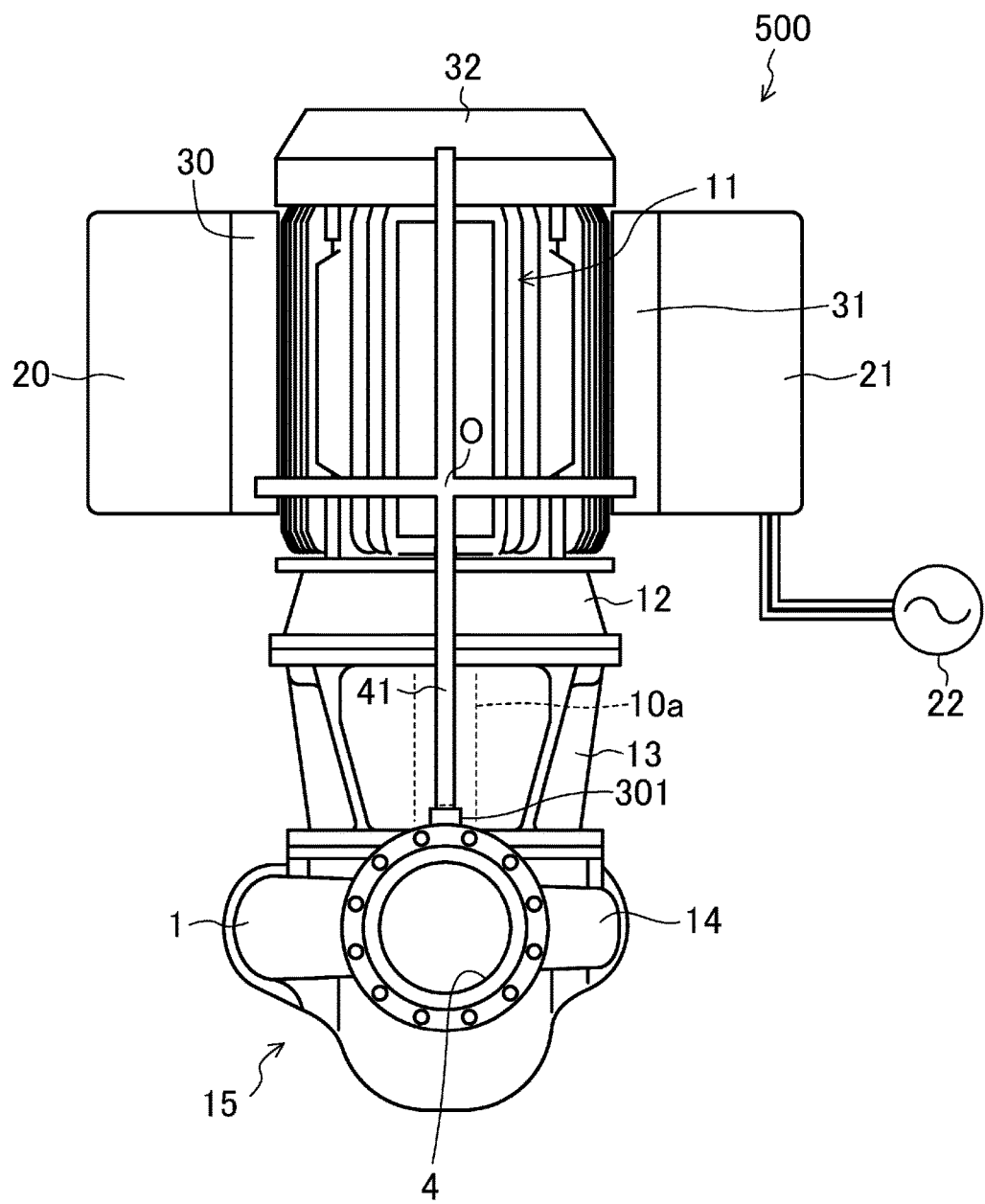
FIG. 2 is a general side elevational view of the fluid device.

A hydroelectric generating system will now be described as an example of a fluid device of the present invention. FIGS. 1 and 2 respectively show a general front elevational view and a general side elevational view of a hydroelectric generating system (500) according to a first embodiment of the present invention.

In FIGS. 1 and 2, the reference characteristics (1) and (2) respectively denote inlet and outlet pipes for a water stream. The hydroelectric generating system (500) is an in-line system in which the inlet pipe (1) and the outlet pipe (2) are aligned with each other on a single line. The inlet pipe (1) is connected to a coolant-drawing device (100), and the outlet pipe (2) is connected to a coolant-returning device (200).

Figure 3:
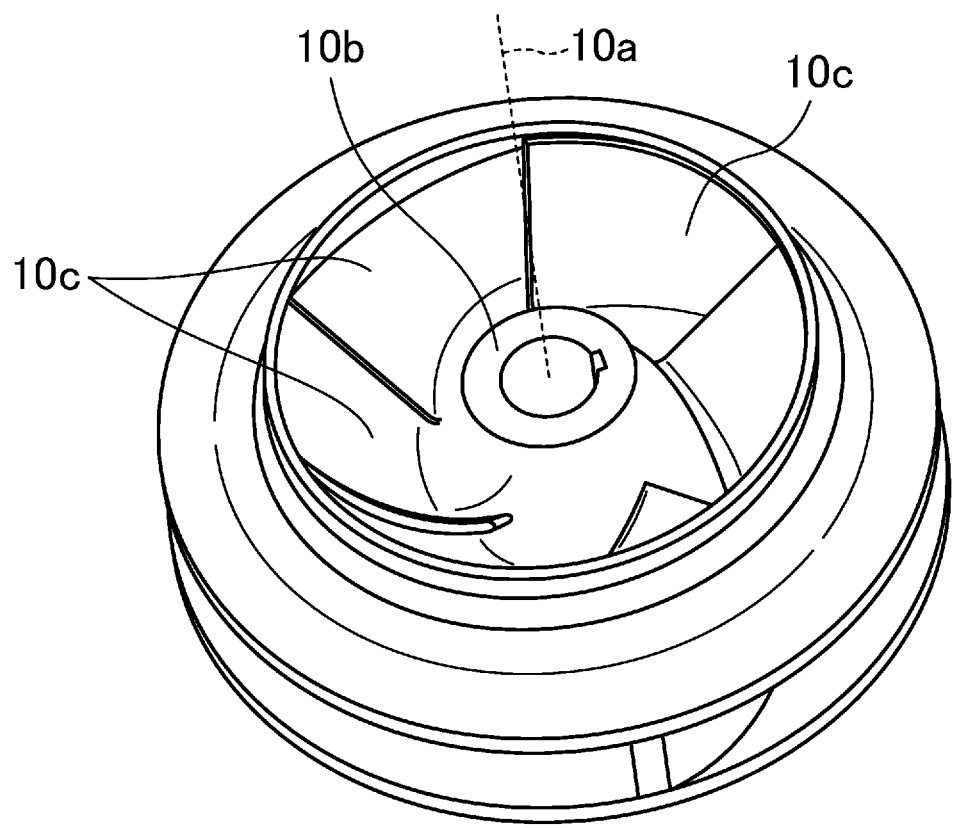
FIG. 3 is a perspective view of an impeller provided to a water wheel included in the fluid device.

The inlet pipe (1) and the outlet pipe (2) make a water stream channel in which a casing (14) is arranged at some midpoint in the water stream channel. The casing (14) houses an impeller (10) illustrated in FIG. 3. The impeller (10) has a rotating shaft (10a) which is vertically arranged with its bottom end connected to the impeller (10). The impeller (10) has a center portion (10b) to which the rotating shaft (10a) is connected. Around the center portion (10b) of the impeller (10), multiple blades (10c) are spirally arranged. Hence, the multiple blades (10c) receive the pressure of a water stream from the inlet pipe (1) to rotate, and the rotating multiple blades (10c) rotates the rotating shaft (10a). An impeller included in a centrifugal pump, for example, may be diverted as this impeller (10).

The inlet pipe (1), the outlet pipe (2), the impeller (10) including the rotating shaft (10a), a hollow pedestal (13) which encases the rotating shaft (10a) of the impeller (10), and the casing (14) constitute a water wheel (i.e., a hydropower machine) (15) which receives the water stream and drives the rotating shaft (10a) to rotate.

Arranged above the water wheel (15) is a generator (i.e., a rotary electric machine) (11) connected to the top end of the rotating shaft (10a) virtually arranged with respect to the water wheel (15). A front cover (12) arranged below this generator (11) and the hollow pedestal (13) encasing the rotating shaft (10a) of the water wheel (15) are fastened by a fastener such as a bolt. The water wheel (15) and the generator (11) are detachably coupled and secured to each other. Hence, the fluid device is of a vertical type with the water wheel (15) and the generator (11) vertically arranged.

The generator (11) is coupled to the rotating shaft (10a) of the water wheel (15), and driven to rotate and generate three-phase AC electric power.

Arranged to the left side of the generator (11) in FIG. 2 (i.e., the horizontal direction perpendicular to the direction of the water stream flowing through the water wheel (15)) is a first power conversion controller (20) acting either as a device, or as a component of the device, for converting or controlling power generated by the generator (11) or power from a power source (22). As an example of this first power conversion controller (20), the first embodiment exemplifies an AC/DC converter converting the three-phase AC electric power, generated by the generator (11), into a direct current. Moreover, arranged to the right side of the generator (11) in FIG. 2 is a second power conversion controller (21) acting either as a device, or as a component of the device, for further converting or controlling the power converted or controlled by the first power conversion controller (20). As an example of this second power conversion controller (21), this embodiment exemplifies a DC/AC converter converting the DC electric power, converted by the exemplified AC/DC converter, into an alternating current to return the converted alternating current to, for example, the commercial power source (22). These AC/DC converter (20) and DC/AC converter (21) are both designed to have approximately the same height and width as the generator (11) has, as seen in FIG. 1.

The AC/DC converter (20) converts the three-phase AC, generated by the generator (11), into a direct current. Moreover, the DC/AC converter (21) converts the direct current, converted by the AC/DC converter (20), into an alternating current, and returns the converted alternating current to, for example, the commercial power source (22).

Note that the AC/DC converter and the DC/AC converter are respectively exemplified as the first power conversion controller (20) and the second power conversion controller (21); however, there may be two or more of such power conversion controllers (20, 21).

Described next is a cooling system, of this vertical-type hydroelectric generating system (500), for cooling the generator (11), the AC/DC converter (20), and the DC/AC converter (21).

At the left side of the generator (11) in FIG. 2, a water-cooling jacket (a first cooler in a bi-directional cooler) (30) is arranged between this generator (11) and the AC/DC converter (20). Through this water-cooling jacket (30), the generator (11) and the AC/DC converter (20) are detachably coupled and secured to each other.

A cooling pipe (40) is connected through a pipe joint (301) to the coolant-drawing device (100) coupled to the upstream flow passageway of the water wheel (15); that is, the inlet pipe (1). Here, a portion of the water stream (i.e., an example of the coolant), bypassed the water wheel (15), flows from the coolant-drawing device (100) into the cooling pipe (40). This cooling pipe (40) horizontally extends toward the water wheel (15), stands upward of the coolant-drawing device (100), bends sideways near a lower portion (I) of the generator (11), and connects to an end, which is positioned upstream of the water wheel (15), of a coolant path in the water-cooling jacket (30). Hence, the water stream is supplied to the water-cooling jacket (30). The other end, which is positioned downstream of the water wheel (15), of the coolant path in the water-cooling jacket (30) is connected to a cooling pipe (41) for discharging the water stream. This cooling pipe (41) horizontally extends downstream of the water wheel (15), bends downward, further horizontally extends downstream of the water wheel (15) at a position directly above the outlet pipe (2), and connects through the pipe joint (301) to an upper portion of the coolant-returning device (200) connected to the outlet pipe (2). Hence, the cooling pipe (41) returns the water to the coolant-returning device (200).

Thus, the water stream to the water-cooling jacket (30) is supplied from upstream of the water wheel (15) through the cooling pipe (40). After that, the water stream is returned to downstream of the water wheel (15) through the cooling pipe (41).

At the right side of the generator (11) in FIG. 2, as the left side of the generator (11), a water-cooling jacket (a second cooler in a bi-directional cooler) (31) is arranged between the generator (11) and the DC/AC converter (21). Through this water-cooling jacket (31), the generator (11) and the DC/AC converter (21) are detachably coupled and secured.

The cooling pipe (40), connected to the coolant-drawing device (100) positioned upstream of the water wheel (15), branches near the lower portion (I) of the generator (11) off toward the right side in FIG. 2, and connects to an upstream end of the coolant path in the water-cooling jacket (31). Hence, the water stream is supplied to the water-cooling jacket (31). Concurrently, the cooling pipe (41), connected to the coolant-returning device (200), branches near a lower portion (O) of the generator (11) off toward the right side in FIG. 2, and connects to a downstream end of the coolant path in the water-cooling jacket (31). Hence, after flowing through the water-cooling jacket (31), the water stream returns to the coolant-returning device (200) via the cooling pipe (41).

Furthermore, a water-cooling rear cover (a rotary electric machine cooler) (32) is arranged above the generator (11). The bottom face of the water-cooling rear cover (32) is detachably secured to the top face of the generator (11). In the water-cooling rear cover (32), a length in the direction of the water stream for the water wheel (15) and a width in the orthogonal direction to the water stream direction are respectively designed to have approximately the same length and width as those of the generator (11). In addition, the water-cooling rear cover (32) includes a coolant path (not shown). This coolant path is arranged to be positioned, for example, near a coil end of the generator (11), and has an end open to upstream of the water wheel (15) and the other end open to downstream of the water wheel (15).

The cooling pipe (40) connected to the coolant-drawing device (100) branches off near the lower portion (I) of the generator (11), extends upward, bends toward downstream of the water wheel (15), and connects to an end of a cooling water path in the water-cooling rear cover (32). Hence, the water stream is supplied to the water-cooling rear cover (32). Concurrently, the cooling pipe (41) connected to the coolant-returning device (200) also branches off near the lower portion (O) of the generator (11), extends upward, bends toward upstream of the water wheel (15), and connects to the other end of the cooling water path in the water-cooling rear cover (32). Hence, after flowing through the water-cooling rear cover (32), the water stream returns to the coolant-returning device (200) via the cooling pipe (41).

In this manner, each of the cooling pipe (40) connected to the coolant-drawing device (100) and the cooling pipe (41) connected to the coolant-returning device (200) branches off near a corresponding one of the lower portions (I, O) of the generator (11) into three directions; namely, toward the left side, toward the right side, and upward in FIG. 2. Each of the branched-off cooling pipes (40, 41) supplies the water stream to the corresponding water-cooling jacket (30), water-cooling jacket (31), and water-cooling rear cover (32) in parallel.

As can be seen, this embodiment allows cooling water (an example of the coolant) to bypass the flow passageways located before and after the water wheel (15), and to be supplied to each of the water cooling jackets (30, 31) and the water-cooling rear cover (32), so that the AC/DC converter (20), the DC/AC converter (21), and the generator (11) (e.g., a bearing) are cooled by water (cooled by coolant).

<<Effects of this Embodiment>>

Consequently, the vertical-type fluid device according to this embodiment allows a portion of the water stream in the inlet pipe (1) to flow through the cooling pipes (40, 41) into the water-cooling jackets (30, 31) to cool the generator (11). Thus, the generator (11) is configured to be a water-cooled generator to enhance the cooling performance for the generator (11), and eliminates the need of, for example, an external fan and its fan cover to reduce the size of the generator (11), compared with an air-cooled generator.

Moreover, the detachably coupled generator (11) and water wheel (15) can be separated during their maintenance and servicing, contributing to improvement in the serviceability of the coupled generator (11) and water wheel (15).

Furthermore, since the AC/DC converter (20) and the DC/AC converter (21) are respectively cooled by the water-cooling jacket (30) and the water-cooling jacket (31), these converters are configured as water-cooled converters. Compared with air-cooled converters, the AC/DC converter (20) and the DC/AC converter (21) can enhance the cooling performance for the devices, and eliminate the need of, for example, cooling fans for air-cooling to reduce the sizes and weights of the converters.

In addition, the AC/DC converter (20) is arranged to the left side of the generator (11) in FIG. 2, and the water-cooling jacket (30) is arranged between the generator (11) and the AC/DC converter (20). This arrangement allows the water-cooling jacket (30) alone to successfully cool both the generator (11) and the AC/DC converter (20).

In a similar manner, the DC/AC converter (21) arranged to the right side of the generator (11) in FIG. 2 and the generator (11) are cooled by the water-cooling jacket (31) sandwiched between the DC/AC converter (21) and the generator (11). This arrangement allows the water-cooling jacket (31) alone to successfully cool both the generator (11) and the DC/AC converter (21).

Besides, the generator (11) and the AC/DC converter (20) are adjacent to each other with the water-cooling jacket (30) alone provided therebetween, and the generator (11) and the DC/AC converter (21) are adjacent to each other with the water-cooling jacket (31) alone provided therebetween. This arrangement makes it possible to eliminate wiring harnesses among the components, contributing to simpler wiring for and a lower price of the fluid device.

Moreover, the water-cooling jackets (30, 31), the AC/DC converter (20), and the DC/AC converter (21) are arranged to the sides of the generator (11) in FIG. 2—that is, in the horizontal direction perpendicular to the direction of the water stream flowing into the water wheel (15). Hence, when these devices and the water wheel (15) are on maintenance and service, it is possible to maintain and service the devices and the water wheel (15) easily, without the obstruction of the inlet pipe (1), the outlet pipe (2), the coolant-drawing device (100) connected to the to the inlet pipe (1), and the coolant-returning device (200) connected to the outlet pipe (2).

In addition, the upper portion of the generator (11) is cooled by the water-cooling rear cover (32) arranged at some midpoint in the cooling pipes (40, 41). This arrangement makes it possible to cool the upper portion of the generator (11), as well as its left and right sides, contributing to enhancing the cooling performance for the generator (11).

Furthermore, each of the tri-branched cooling pipe (40) for supplying water and the tri-branched cooling pipe (41) for discharging water provides a water stream in parallel to the water-cooling rear cover (32) arranged above the generator (11) and the two water-cooling jackets (30, 31) arranged to the respective sides of the generator (11). This feature makes it possible to reduce the resistance of these cooling pipes (40, 41), contributing to successfully cooling the generator (11), the AC/DC converter (20), and the DC/AC converter (21) even if this vertical-type hydroelectric generating system (500) is installed in a place in which the difference in height is small.

<<Configuration of Coolant-Drawing Device>>

FIG. 4 illustrates the coolant-drawing device (100) according to the first embodiment. FIGS. 4A and 4B are respectively a front elevational view and a side elevational and cross-sectional view of the coolant-drawing device (100). (The same shall apply hereinafter.) The coolant-drawing device (100) includes a flanged pipe (3) having flanges on its respective two ends, and a suction pipe (103) which extracts a fluid in the flanged pipe as a coolant. The flanged pipe (3) is an example of a pipe joint.

The suction pipe (103) is made of a pipe bent in an L-shape, and one of its ends is shaped into a cone (i.e., a corn portion (104)) so that the diameter of the suction pipe (103) is greater toward the end. The suction pipe (103) has a water inlet (106) which opens to the corn portion (104) to take in cooling water. The suction pipe (103) is manufactured by expanding a strait pipe, which makes it possible to manufacture the coolant-drawing device (100) at a low cost.

The corn portion (104) of the suction pipe (103) is covered with a rectifying member (105). Specifically, the rectifying member (105) is provided to cover the corn portion (104) of the suction pipe (103), so that the suction pipe (103) does not act as resistance against the water stream flowing through the flanged pipe (3). In this example, the rectifying member (105) includes two portions as illustrated in FIG. 4B. One of the portions is cylindrical and formed between an end of the suction pipe (103) having the corn portion (104) and a region (a bending portion) at which the suction pipe (103) bends. The other portion is approximately spherical and formed to the right (on the observer's right in FIG. 4) of the bending portion. The suction pipe (103) is then attached to the flanged pipe (3) so that the water inlet (106) is open toward the opening of the flanged pipe (3). (See FIG. 4B.) The suction pipe (103) (i.e., the corn portion (104)) and the rectifying member (105) constitute an example of a dynamic pressure applicator.

In this embodiment, the coolant-drawing device (100) and the inlet pipe (1) are fastened via their respective flanges. In this case, the coolant-drawing device (100) is fastened to the inlet pipe (1) so that the water inlet (106) of the suction pipe (103) faces the opposite—that is, upstream—of the water wheel (15) in the inlet pipe (1). In other words, the water inlet (106) of the suction pipe (103) is open in the flanged pipe (3) in the direction in which the water inlet (106) receives the dynamic pressure of a fluid flowing through the flanged pipe (3). This suction pipe (103) is then connected to the cooling pipe (40) via the pipe joint (301).

<<Configuration of Coolant-Returning Device>>

FIGS. 5A and 5B illustrate the coolant-returning device (200) according to the first embodiment. The coolant-returning device (200) includes a flanged pipe (4) having flanges on its respective two ends, and a discharging pipe (203) which returns cooling water to the flanged pipe (4). Here, the returned cooling water has been used for cooling, for example, the AC/DC converter (20). The flanged pipe (4) is an example of a pipe joint.

The discharging pipe (203) is made of a pipe bent in an L-shape. Furthermore, the discharging pipe (203) is covered with a rectifying member (205). The rectifying member (205) is provided so that the discharging pipe (203) does not act as resistance against the water stream flowing through the flanged pipe (4). In this example, the both ends of the rectifying member (205) are streamlined as illustrated in FIG. 5B. The discharging pipe (203) and the rectifying member (205) constitute an example of a dynamic pressure applicator.

In this embodiment, the coolant-drawing device (200) and the outlet pipe (2) are fastened via their respective flanges. In this case, the coolant-returning device (200) is fastened to the outlet pipe (2) so that the opening (i.e., a water outlet (206)) of an end, which is provided to the discharging pipe (203) and included in the flanged pipe (4), faces the opposite—that is, downstream—of the outlet pipe (2). In other words, the water outlet (206) is open in the flanged pipe (4) in the direction in which a coolant within the discharging pipe (203) is sucked out by the flow of a fluid in the flanged pipe (4). This suction pipe (203) is then connected to the cooling pipe (41) via the pipe joint (301).

<<Operations for Extracting and Returning Coolant>>

In this embodiment, a water stream supplied into the coolant-drawing device (100) enters the water wheel (15) via the inlet pipe (1). Furthermore, in the coolant-drawing device (100), the dynamic pressure created by the water stream acts on the water inlet (106) of the suction pipe (103). (Directions of water streams are indicated by arrows in drawings such as FIG. 4B. The same shall apply hereinafter.) As a result, the water in the coolant-drawing device (100) is supplied as cooling water from the suction pipe (103) through the cooling pipe (40) to each of the water-cooling jackets (30, 31), and the water-cooling rear cover (32). The supplied water can successfully cool the AC/DC converter (20) and the DC/AC converter (21). The cooling water passed through the water-cooling jackets (30, 31) and the water-cooling rear cover (32) then flows into the cooling pipe (41). In the coolant-returning device (200), the water outlet (206) of the discharging pipe (203) faces downstream of the water stream; thus, the stream of water discharged from the water wheel (15) sucks the water (cooling water) in the discharging pipe (203) out of the water outlet (206). As a result, the cooling water in the cooling pipe (41) is discharged into the coolant-returning device (200). As can be seen, this embodiment allows the cooling water to circulate and successfully cool the AC/DC converter (20) and the DC/AC converter (21).

In this embodiment, the coolant-drawing device (100) takes cooling water, using the dynamic pressure of the water flowing into the water wheel (15), and supplies the taken cooling water to the water-cooling jackets (30, 31) and the water-cooling rear cover (32). Hence, this embodiment easily enables water-cooling the generator (11) (i.e., a rotary electric machine) and an electrical component such as the AC/DC converter (20) and the DC/AC converter (21) without power such as a pump, while keeping the structure of the coolant-drawing device (100) simple. In other words, this embodiment is useful for water-cooling a generator (i.e., an example of the rotary electric machine) and an electrical component such as the DC/AC converter (21) in a small-scale hydroelectric generating system (i.e., an example of the fluid device) into which a relatively small amount of water flow.

Moreover, the coolant-returning device (200) has the discharging pipe (203) that opens in the flanged pipe (4) in the direction in which the cooling water inside the cooling pipe (41) is sucked out by the flow of the water in the flanged pipe (4). Hence, from this viewpoint too, this embodiment easily enables water-cooling a rotary electric machine and an electrical component in a relatively small-scale fluid device into which a relatively small amount of water flow.

Note that the positions of the water inlet (106) and the water outlet (206) are examples. FIGS. 6A, 6B, 7A, and 7B exemplify the water inlet (106) and the water outlet (206) aligned with the respective centers of the flanged pipes (3, 4).

<<First Variation of First Embodiment>>

FIGS. 8A and 8B illustrate the coolant-returning device (100) according to the first variation. Specifically, the suction pipe (103) is connected to the flanged pipe (3). Here, the suction pipe (103) is made of a pipe bent in an L-shape, and one of its ends is shaped into a cone so that the diameter of the suction pipe (103) is greater toward the end. The suction pipe (103) is also manufactured by expanding a strait pipe, which makes it possible to manufacture the coolant-drawing device (100) at a low cost. Moreover, this coolant-drawing device (100) can be connected to the outlet pipe (2) and used as the coolant-returning device (200). When the coolant-drawing device (100) is used as the coolant-returning device (200), the opening (i.e., the water inlet (106)) of the suction pipe (103) faces downstream.

Note that FIGS. 9A and 9B exemplify the water inlet (106) aligned with the centers of the flanged pipes (3, 4) in the first variation.

<<Second Variation of First Embodiment>>

FIGS. 10A and 10B illustrate the coolant-returning device (100) according to the second variation. In this example, the flanged pipe (3) has a pocket (107) on an inner peripheral surface of the flanged pipe (3), and the suction pipe (103) is connected to communicate with the empty space in the pocket (107). The water inlet (106) is an opening of the pocket (107). Furthermore, the suction pipe (103) is straight in the example of FIGS. 10A and 10B. In this example too, the coolant-drawing device (100) is arranged so that the water inlet (106) faces upstream. This arrangement makes it possible to take the cooling water in by the dynamic pressure. In this example, the pocket (107) and the discharging pipe (103) constitute an example of a dynamic pressure applicator.

In this example, the coolant-drawing device (100) can also be used as the coolant-returning device (200). FIGS. 11A and 11B illustrate the directions of water streams when the coolant-drawing device (100) according to the second variation is used as the coolant-returning device (200). The opening, which works as the water inlet (106) of the coolant-drawing device (100), works as the water outlet (206). In this variation, the coolant-drawing device (100) and the coolant-returning device (200) are interchangeable, which contributes to reducing their manufacturing costs.

<<Third Variation of First Embodiment>>

FIGS. 12A and 12B illustrate the coolant-returning device (100) according to the third variation. In this example, the coolant-drawing device (100) comprises the flanged pipe (3) and the suction pipe (103) secured to the flanged pipe (3). Here, the suction pipe (103) is made of a pipe bent in an L-shape. Moreover, the water inlet (106) is aligned with the centers of the flanged pipes (3, 4). This design enables easy working on the device, and promises a low manufacturing cost. In this example too, the coolant-drawing device (100) is arranged so that the water inlet (106) faces upstream. This arrangement makes it possible to take the cooling water in by the dynamic pressure.

Note that FIGS. 13A and 13B exemplify the water inlet (106) offset from the center of the flanged pipe (3) in the third variation. Moreover, this coolant-drawing device (100) according to this variation can be connected to the outlet pipe (2) and used as the coolant-returning device (200). When the coolant-drawing device (100) is used as the coolant-returning device (200), the opening (i.e., the water inlet (106)) of the suction pipe (103) faces downstream.

<<Fourth Variation of First Embodiment>>

Figure 14A:
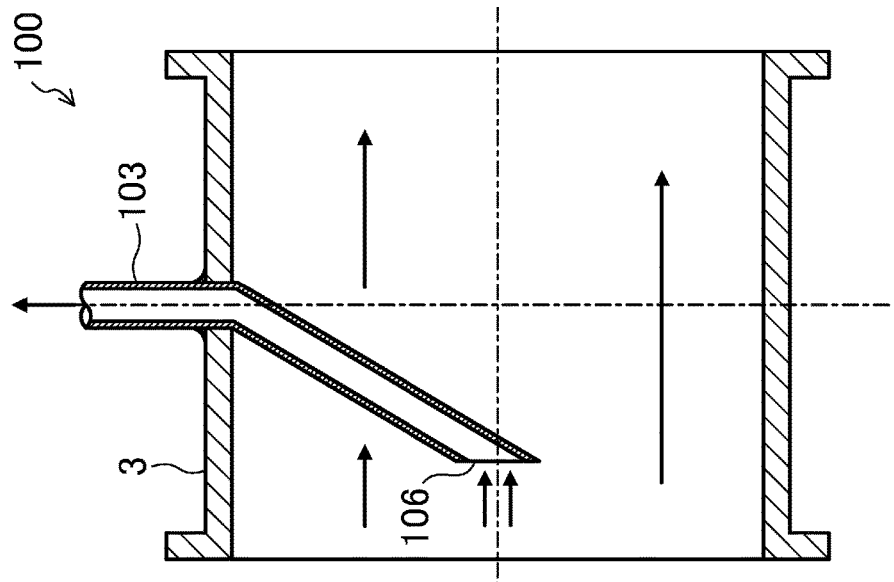
FIGS. 14A and 14B are respectively a front elevational view and a side elevational and cross-sectional view of the coolant-drawing device according to a fourth variation.
Figure 14B:
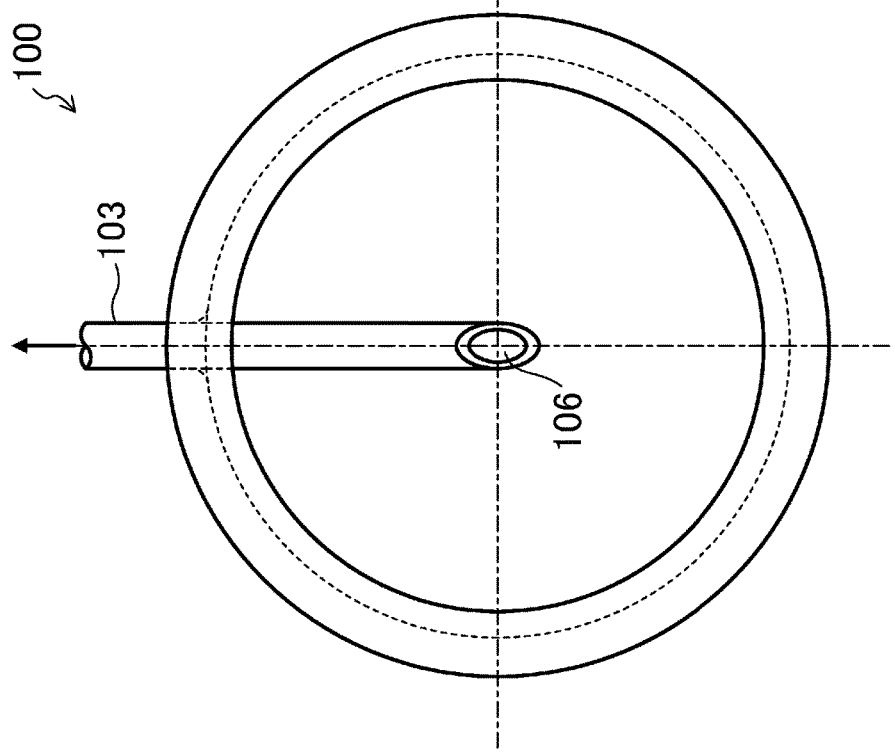
Figure 15A:
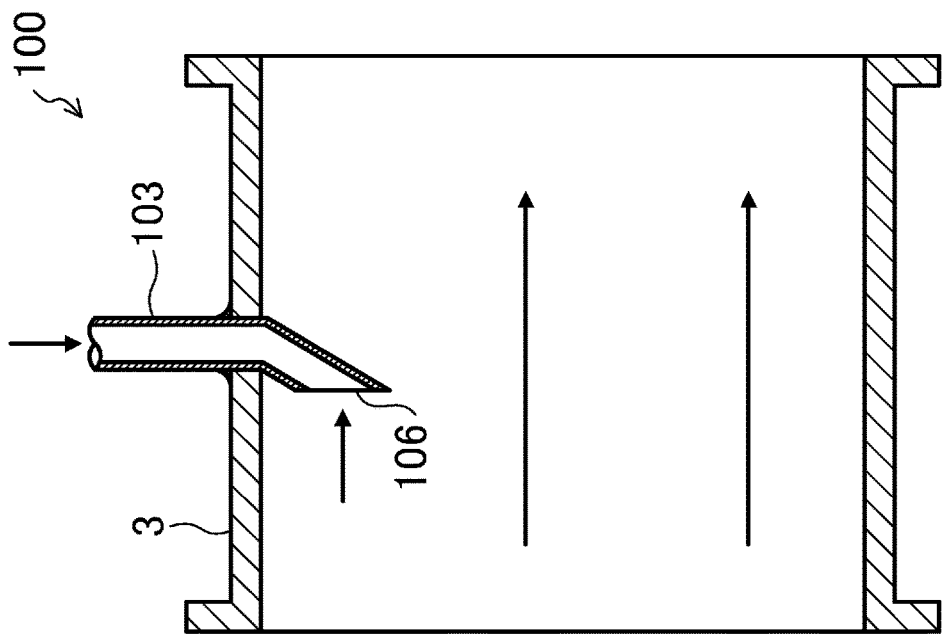
FIGS. 15A and 15B are respectively a front elevational view and a side elevational and cross-sectional view of the coolant-drawing device having a water inlet offset from the center of the flanged pipe in the fourth variation.
Figure 15B:
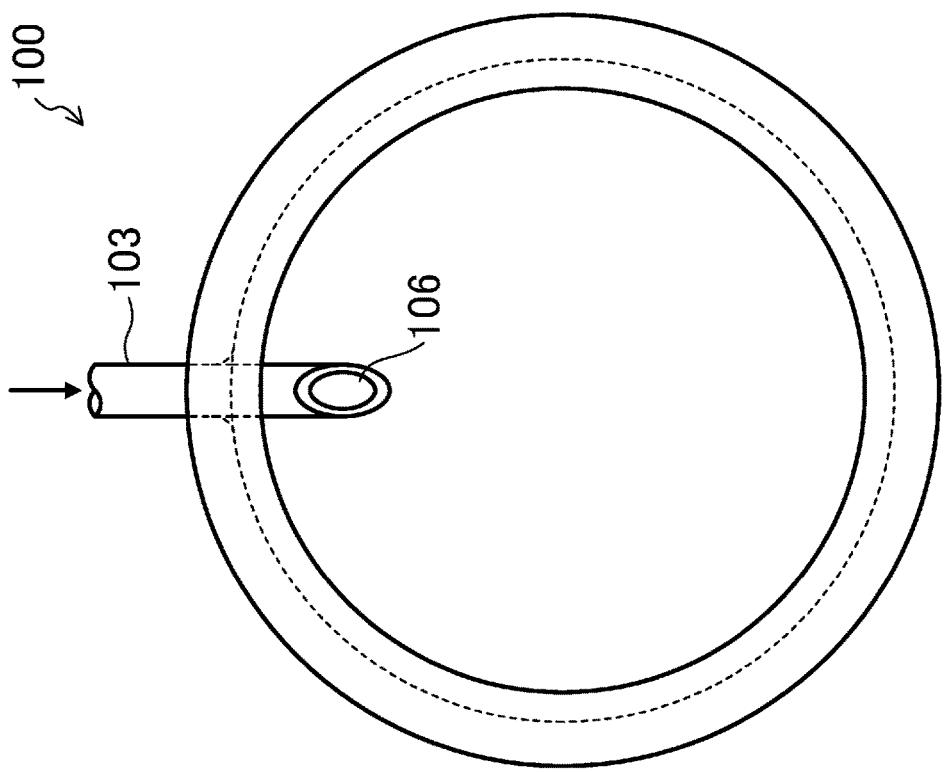

FIGS. 14A and 14B illustrate the coolant-returning device (100) according to the fourth variation. In this example, the coolant-drawing device (100) comprises the flanged pipe (3) and the suction pipe (103) secured to the flanged pipe (3). Here, the suction pipe (103) is made of a pipe whose tip is beveled to create a sharp pointed tip such as the tip of a hypodermic needle. Moreover, the water inlet (106) is aligned with the centers of the flanged pipes (3, 4). In this example too, the coolant-drawing device (100) is arranged so that the water inlet (106) faces upstream. This arrangement makes it possible to take the cooling water in by the dynamic pressure. Note that FIGS. 15A and 15B exemplify the water inlet (106) offset from the center of the flanged pipe (3) in the fourth variation.

<<Second Embodiment of the Invention>>

FIG. 16 is a longitudinal cross-sectional views of the hydroelectric generating system (500) according to a second embodiment. In this example, the generator (11) and the water wheel (15) are included in a pipe (i.e., a main pipe (400)). The hydroelectric generating system (500) having such a structure can also use the coolant-drawing device (100) and the coolant-returning device (200) described in the first embodiment and its variations. FIG. 16 exemplifies a use of the coolant-drawing device (100) and the coolant-returning device (200) in the first embodiment.

In the example of FIG. 16, a water-cooling jacket (30) similar to that in the first embodiment is coupled to the outer peripheral surface of the main pipe (400). The water-cooling jacket (30) has the AC/DC converter (20) and the DC/AC converter (21) secured thereto, and cools these electrical components.

Figure 17:
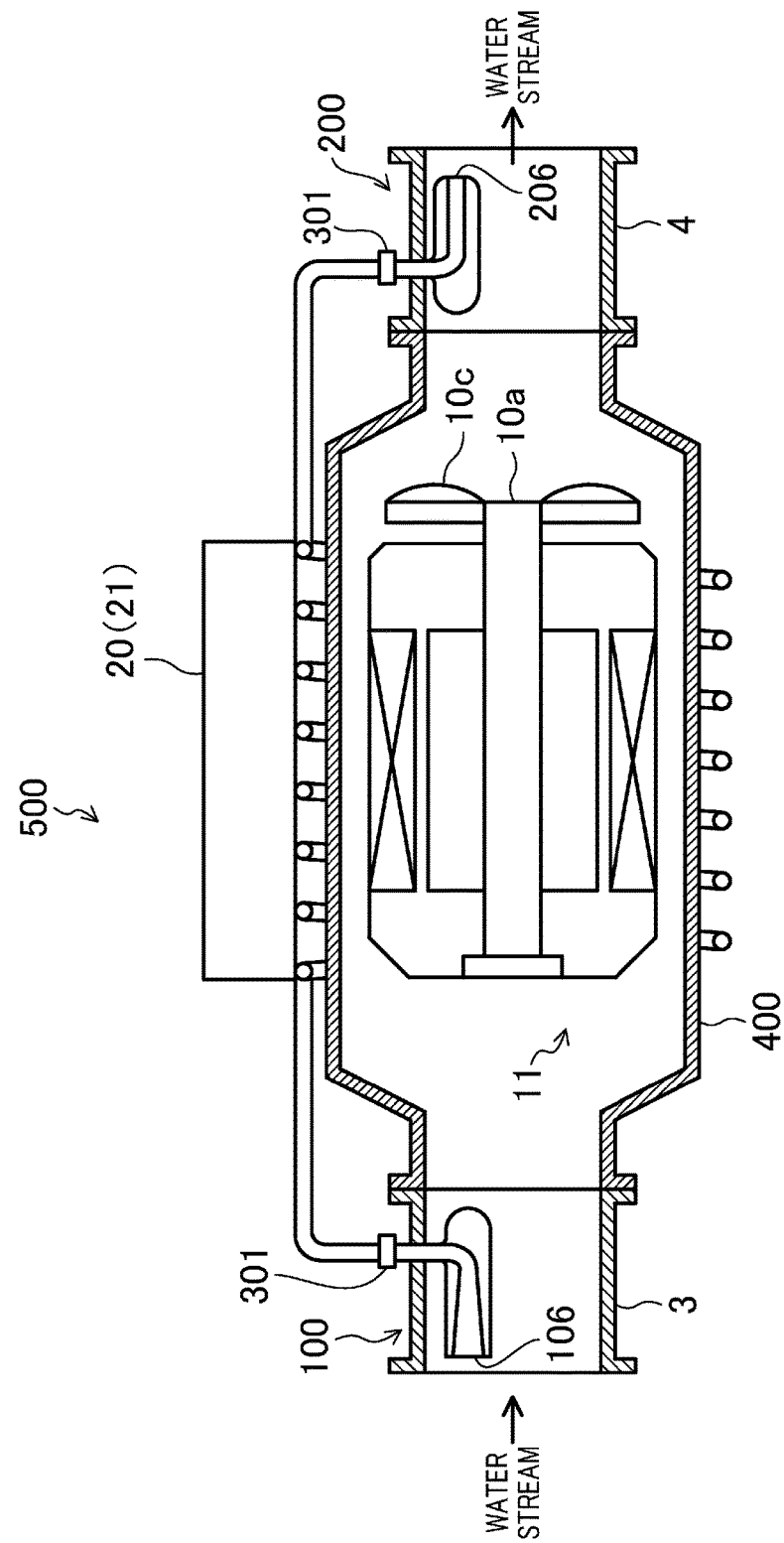
FIG. 17 is a longitudinal cross-sectional view of the hydroelectric generating system according to a variation of the second embodiment.

As a matter of course, the use of the water-cooling jacket (30) is an example, and the electrical components may be cooled with another method. FIG. 17 shows an example without the water-cooling jacket (30), and a pipe is looped around the main pipe (400). Such a structure also enables cooling the electrical components.

(Other Embodiments)

The embodiments as seen in the present invention may include the configurations below.

The above embodiments describe the vertical-type fluid device into which the following components are detachably assembled: the water wheel (15), the generator (11), the AC/DC converter (20), the DC/AC converter (21), the two water-cooling jackets (30, 31), and the water-cooling rear cover (32); however, the present invention shall not be defined as it is. Another configuration adoptable to the present invention may be a horizontal-type fluid device instead of the vertical-type fluid device having the water wheel (15) and the generator (11) vertically arranged. Still another configuration adoptable to the present invention may allow the DC/AC converter (21) and the water-cooling jacket (31) to be separately disposed instead of securing the DC/AC converter (21) to the side of the generator (11). In addition, the present invention is adoptable in the case of not only simultaneously cooling all the generator (11), the AC/DC converter (20), and the DC/AC converter (21), but also cooling the AC/DC converter (20) or the DC/AC converter (21) alone. Specifically, the present invention is adoptable when cooling at least one of the generator (the rotary electric machine) (11) or the power conversion controllers (20, 21).

Furthermore, the configurations adopted in the above embodiments allow each of the cooling pipes (40, 41) to branch into three to supply a water stream in parallel to the two water-cooling jackets (30, 31), and the water-cooling rear cover (32). When installed in a place in which the difference in height is small, for example, the vertical-type fluid device may be configured to supply the water stream in series to the water-cooling jackets (30, 31) and the water-cooling rear cover (32), without branching off the cooling pipes (40, 41).

Additionally, the water-cooling rear cover (32) is exemplified as a rotary electric machine cooler; instead, the front cover (12) may be adopted to cool the coil end as the water-cooling rear cover (32) does. Moreover, the bearings included in the rear and front covers may be cooled at the same time.

Furthermore, in the above embodiments, the first and second power conversion controllers (20, 21) and the first and second cooler (30, 31) are arranged to the sides of the generator (11) that are perpendicular to the direction of the water stream flowing through the water wheel (15); however, the present invention shall not be defined as it is. Another arrangement may include disposing these components (20, 21, 30, and 31) to the sides of the generator (11) that are in parallel with the direction of the water stream flowing through the water wheel (15). In this case, these components (20, 21, 30, and 31) are arranged along the flanged pipes (3, 4) connected to the water wheel (15), contributing to downsizing the entire fluid device.

In addition, the impeller (10) is configured to be disposed in the connecting portion between the inlet pipe (1) and the outlet pipe (2), and create a water stream. However, the fluid device of the present invention may use another refrigerant, such as brine, instead of water. As a matter of course, in handling flows of various fluids other than water, the impeller (10) may be configured in a similar manner.

Note that the fluid device described in the embodiments utilizes the rotation of the impeller (10) that receives a water stream to drive the generator (11) for generating electricity; however, the present invention shall not be defined as it is. When the generator (11) and the water wheel (15) are respectively replaced with an electric motor and a pump, the present invention is applicable to a fluid device which drives the pump by the rotation of the electric motor powered by electricity to cause the flow of a fluid. In this fluid device, the AC/DC converter (the first power conversion controller) (20) converts an alternating current, provided from the commercial power source (22), into a direct current, and the DC/AC converter (the second power conversion controller) (21) converts the direct current converted by the AC/DC converter (20) into a three-phase AC, and supplies the three-phase AC to an electric motor.

Moreover, any given combination of the coolant-drawing device (100) and the coolant-returning device (200), described in the first embodiment and its variations, is available. For example, the coolant-drawing device (100) according to first embodiment and the coolant-returning device (200) according to the first variation may be used in a pair.

Furthermore, instead of being used for the hydroelectric generating system, the coolant-drawing device (100) and the coolant-returning device (200) may also be used for a pump system (i.e., an example of the fluid device) including, for example, a pump (i.e., an example of the hydropower machine) and a motor (an example of the rotary electric machine) driving the pump. It is also important for the pump system to appropriately cool the motor and a power conversion controller which supplies power to the motor. In using the coolant-drawing device (100) and the coolant-returning device (200) for the pump system, the coolant-returning device (200) is connected to the suction opening of the pump and the coolant-drawing device (100) is connected to the discharge opening of the pump. In other words, the coolant-drawing device (100) is connected to one of the inlet pipe (1) where a fluid to the hydropower machine (15) enters or the outlet pipe (2) where a fluid from the hydropower machine (15) exits, whichever having a higher water pressure. The coolant-returning device (200) is connected to the other one of the inlet pipe (1) or the outlet pipe (2), whichever having a lower water pressure.

Moreover, the components to be cooled by the coolant shall not be limited to the rotary electric machine (11) and the power conversion controllers (20, 21).

Furthermore, the flanged pipes (3, 4) are an example of pipe joints. For example, a so-called wafer-style pipe joint may be adopted.

INDUSTRIAL APPLICABILITY

As can be seen, the present invention is usefully applicable to a fluid device including a water wheel and a generator, and a fluid device including a pump and an electric motor. This is because the present invention successfully improves the cooling performance for a rotary electric machine, such as the generator and the electric motor, or a power conversion controller, and allows the fluid machine (i.e., the water wheel and the pump), the rotary electric machine, and the power conversion controller to be small in size and detachably coupled to each other, contributing to improvements in their maintainability and serviceability.

DESCRIPTION OF REFERENCE CHARACTERS

1 Inlet Pipe
2 Outlet Pipe
10 Impeller
10a Rotating Shaft
10c Blade
11 Generator (Rotary Electric Machine)
12 Front Cover
15 Water Wheel (Hydropower Machine)
20 AC/DC Converter (First Power Conversion Controller)
21 DC/AC Converter (Second Power Conversion Controller)
30 Water-Cooling Jacket (Bi-Directional Cooler, First Cooler)
31 Water-Cooling Jacket (Bi-Directional Cooler, Second Cooler)
32 Water-Cooling Rear Cover (Rotary Electric Machine Cooler)
40, 41 Cooling Pipe
100 Coolant-Drawing Device
103 Suction Pipe (Dynamic Pressure Applicator)
200 Coolant-Returning Device
203 Discharging Pipe
500 Hydroelectric Generating System (Fluid Device)

The invention claimed is:

1. A fluid device including a hydropower machine, and generator coupled to the hydropower machine, the fluid device comprising:
a first pipe joint connected to an inlet pipe of the hydropower machine and configured to introduce a fluid to the hydropower machine, the first pipe joint being separated from the hydropower machine;
a second pipe joint connected to an outlet pipe of the hydropower machine and configured to lead the fluid out of the hydropower machine, the second pipe joint being separated from the hydropower machine;
a first cooling pipe connected to the first pipe joint;
a second cooling pipe connected to the second pipe joint; and
a cooler configured to carry out liquid-cooling using the fluid, wherein the cooler is configured to receive fluid from the first pipe joint and discharge the fluid into the second pipe joint such that the fluid passing through the first and second cooling pipes bypasses the hydropower machine, and
the hydropower machine and the generator are detachably coupled to each other,
the fluid device further comprises:
a power conversion controller, wherein
the cooler is a bi-directional cooler sandwiched between the generator and the power conversion controller, and configured to cool both the generator and the power conversion controller using the fluid flowing through the cooling pipe,
the power conversion controller includes:
a first power conversion controller configured to convert or control power obtained by the generator or from a power source; and
a second power conversion controller configured to further convert or control the power converted or controlled by the first power conversion controller, and
the bi-directional cooler includes:
a first cooler sandwiched between the generator and the first power conversion controller; and
a second cooler sandwiched between the generator and the second power conversion controller, and
the first power conversion controller and the second power conversion controller face each other across the generator.

2. The fluid device of claim 1, further comprising
a rotary electric machine cooler configured to cool the generator using the fluid supplied through the cooling pipe, wherein
the rotary electric machine cooler is positioned at an end portion of the generator, the end portion being other than end portions, of the generator, at which the first and second coolers are positioned.

3. The fluid device of claim 2, wherein
the generator is arranged above the hydropower machine,
the first and second power conversion controllers and the first and second coolers are arranged to sides of the generator, the sides being perpendicular to a direction of a fluid flowing through the hydropower machine, and
the rotary electric machine cooler is arranged above the generator.

4. The fluid device of claim 2, wherein
the generator is arranged above the hydropower machine,
the first and second power conversion controllers and the first and second coolers are arranged to sides of the generator, the sides being in parallel with a direction of a fluid flowing through the hydropower machine, and
the rotary electric machine cooler is arranged above the generator.

5. The fluid device of claim 2, wherein the cooling pipe branches in parallel off to the first and second coolers of the bi-directional cooler, and to the rotary electric machine cooler.

6. The fluid device of claim 3, wherein the cooling pipe branches in parallel off to the first and second coolers of the bi-directional cooler, and to the rotary electric machine cooler.

7. The fluid device of claim 4, wherein the cooling pipe branches in parallel off to the first and second coolers of the bi-directional cooler, and to the rotary electric machine cooler.

* * * * *